(12) United States Patent
Park et al.

(10) Patent No.: US 7,663,710 B2
(45) Date of Patent: Feb. 16, 2010

(54) LIQUID CRYSTAL DISPLAY DEVICE OF HORIZONTAL ELECTRIC FIELD TYPE AND FABRICATING METHOD THEREOF

(75) Inventors: Seoung Jin Park, Daegu (KR); Hyun Cheol Jin, Gumi-si (KR)

(73) Assignee: LG Display Co., Ltd., Seoul (KR)

( * ) Notice: Subject to any disclaimer, the term of this patent is extended or adjusted under 35 U.S.C. 154(b) by 318 days.

(21) Appl. No.: 11/479,427

(22) Filed: Jun. 29, 2006

(65) Prior Publication Data

US 2007/0103611 A1 May 10, 2007

(30) Foreign Application Priority Data

Nov. 10, 2005 (KR) .................. P2005-0107624

(51) Int. Cl.
*G02F 1/1333* (2006.01)
*G02F 1/1334* (2006.01)
*G02F 1/13* (2006.01)
(52) U.S. Cl. .................. 349/54; 349/40; 349/141; 349/192
(58) Field of Classification Search .............. 349/40, 349/54, 141, 192
See application file for complete search history.

(56) References Cited

U.S. PATENT DOCUMENTS

| 5,745,207 | A | * | 4/1998 | Asada et al. | 349/141 |
| 6,876,404 | B2 | * | 4/2005 | Park et al. | 349/38 |
| 6,900,854 | B1 | * | 5/2005 | Kim et al. | 349/43 |
| 7,139,058 | B2 | * | 11/2006 | Son et al. | 349/141 |
| 7,170,570 | B2 | * | 1/2007 | Kim et al. | 349/43 |
| 7,295,257 | B2 | * | 11/2007 | Kim et al. | 349/43 |
| 7,379,142 | B2 | * | 5/2008 | Tak et al. | 349/129 |

* cited by examiner

*Primary Examiner*—Uyen-Chau N Le
*Assistant Examiner*—Rhonda S Peace
(74) *Attorney, Agent, or Firm*—Brinks Hofer Gilson & Lione

(57) ABSTRACT

A liquid crystal display device of horizontal electric field type and a fabricating method thereof is provided.

The liquid crystal display device includes a plurality of gate lines. Data lines cross in such a manner to insulate with the gate lines to define a pixel area. A first short preventive hole is arranged between a (n−1)th gate line and a (n)th gate line of the plurality of gate lines. And a bifarious pixel area is arranged between the (n)th gate line and a (n+1)th gate line of the plurality of gate lines.

11 Claims, 21 Drawing Sheets

LIQUID CRYSTAL DISPLAY DEVICE OF HORIZONTAL ELECTRIC FIELD TYPE AND FABRICATING METHOD THEREOF

This application claims the benefit of Korean Patent Application No. P2005-0107624 filed in Korea on Nov. 10, 2005, which is hereby incorporated by reference.

BACKGROUND

1. Field

A liquid crystal display device using a horizontal electric field and a fabricating method thereof are provided.

2. Related Art

Generally, a liquid crystal display device controls light transmittance of a liquid crystal having a dielectric anisotropy using an electric field to display a picture. Such liquid crystal display devices are largely classified into vertical electric field applying types and horizontal electric field types depending upon the direction of the electric field driving the liquid crystal.

The liquid crystal display device of vertical electric field types drive a liquid crystal with a vertical electric field that is formed between a pixel electrode and a common electrode, which are arranged in opposition to each other on the upper and lower substrate. Liquid crystal display devices of the vertical electric field type have a large aperture ratio while having a a narrow viewing angle about 90°.

The liquid crystal display device of horizontal electric field types drive a liquid crystal with a horizontal electric field that is between the pixel electrode and the common electrode, which are arranged in parallel to each other on the lower substrate. An example of a liquid crystal display device of horizontal electric field type is an in plane switching (IPS) mode. Liquid crystal display devices of horizontal electric field type have a wide viewing angle of approximately about 160°. Hereinafter, the liquid crystal display device of horizontal electric field type will be described in detail.

A liquid crystal display device of horizontal electric field type includes a thin film transistor substrate (lower substrate) and a color filter array substrates (upper substrate) that are opposed to each other and united. A spacer constantly keeps a cell gap between the two substrates. A liquid crystal is disposed in the cell gap.

FIG. 1 is a plan view showing a portion of a related art thin film transistor substrate of a horizontal electric field type, and FIG. 2 is a section view of the thin film transistor substrate taken along the I-I' and II-II' lines in FIG. 1.

Referring to FIG. 1 and FIG. 2, the thin film transistor substrate includes a gate line 2 and a data line 4 provided on a lower substrate 45. The gate line 2 and the data line 4 are disposed in such a manner that intersects each other and have a gate insulating film 46 therebetween. A thin film transistor 6 is formed at each intersection. A pixel electrode 14 and a common electrode 18 provide a horizontal electric field at a pixel area that is defined by an intersection structure. A common line 16 is connected to the common electrode 18. The thin film transistor substrate further includes a storage capacitor 20 formed at an overlapping portion of the pixel electrode 14 and a common electrode line 16. A gate pad 24 is connected to the gate line 2. A data pad 30 is connected to the data line 4 and a common pad 36 is connected to the common line 16.

The gate line 2 that supplies a gate signal and the data line 4 that supplies a data signal are provided in an intersection structure to define a pixel area.

The common line 16 supplies a reference voltage that drives the liquid crystal is formed in parallel to the gate line 2 with the pixel area disposed therebetween.

The thin film transistor 6 allows a pixel signal applied to the data line 4 to be charged into the pixel electrode 14 and be kept in response to a scanning signal applied to the gate line 2. The thin film transistor 6 includes a gate electrode 8 that is connected to the gate line 2. A source electrode 10 is connected to the data line 4. A drain electrode 12 is connected to the pixel electrode 14. An active layer 48 overlaps with the gate electrode 8 with a gate insulating film 46 disposed therebetween to define a channel between the source electrode 10 and the drain electrode 12. An ohmic contact layer 50 makes an ohmic contact with the source electrode 10, the drain electrode 12 and an active layer 48.

The active layer 48 and the ohmic contact layer 50 are formed in such a manner to overlap with the data line 4, a lower data pad electrode 32 and an upper storage electrode 22.

The pixel electrode 14 is connected, via a first contact hole 13 passing through a protective film 52, to the drain electrode 12 of the thin film transistor 6 and formed at the pixel area. The pixel electrode 14 includes a first horizontal portion 14A connected to the drain electrode 12 and formed in parallel to the adjacent gate line 2. A second horizontal portion 14B is formed in such a manner that overlaps with the common line 16 and a finger portion 14C formed in parallel between the first and second horizontal portions 14A and 14B.

The common electrode 18 is connected to the common line 16 and is formed at the pixel area 5. The common electrode 18 is formed in parallel to the finger portion 14C of the pixel electrode 14 at the pixel area 5.

A horizontal electric field is formed between the pixel electrode 14 supplied with a pixel signal, via the thin film transistor 6 and the common electrode 18 supplied with a reference voltage (Hereinafter, a common electrode), via the common line 16. More specifically, a horizontal electric field is formed between the finger portion 14C of the pixel electrode 14 and the common electrode 18. Liquid crystal molecules that are arranged in the horizontal direction between the thin film transistor substrate and the color filter substrate by such a horizontal electric field are rotated due to a dielectric anisotropy. Transmittance of a light that transmits the pixel area is differentiated depending upon a rotation extent of the liquid crystal molecules, thereby implementing a gray level scale.

The storage capacitor 20 is comprised of the common line 16, and the upper storage electrode 22 that overlaps with the common line 16 with has the gate insulating film 46, the active layer 48 and the ohmic contact layer 50 therebetween and connected, via a second contact hole 21 provided on a protective film 50, to the pixel electrode 14. The storage capacitor 20 allows a pixel signal charged in the pixel electrode 14 to be maintained in a stable state until the next signal is charged.

The gate line 2 is connected, via the gate pad 24, to the gate driver (not shown). The gate pad 24 is comprised of a lower gate pad electrode 26 extended from the gate line 2 and an upper gate pad electrode 28 connected, via a third contact hole 27 passing through the gate insulating film 46 and a protective film 52, to the lower gate pad electrode 26.

The data line 4 is connected, via the data pad 30, to the data driver (not shown). The data pad 30 is comprised of a lower data pad electrode 32 extended from the data line 4 and an upper data pad electrode 34 connected, via a fourth contact hole 33 passing through the protective film 52, to the lower data pad electrode 32.

The common line 16 is supplied, via a common pad 36, with a common voltage from a common voltage source (not shown). The common pad 36 is comprised of a lower common pad electrode 38 that extends from the common line 16 and an upper common pad electrode 40 connected, via a five contact hole 39 passing through the gate insulating film 46 and the protective film 52, to the lower common pad electrode 38.

The common electrode 18 provided at the pixel area is formed from an opaque gate metal and has a low aperture ratio.

There is a limit to the overlapping area between the common electrode 16 formed from an opaque metal and the upper storage electrode 22 by an aperture ratio. Accordingly, the capacitance of the storage capacitor 20 is limited.

A related art thin film transistor substrate of a liquid crystal display device of a horizontal electric field type is formed by a plurality of mask processes. One mask process includes a lot of sub-processes such as deposition, cleaning, photolithography, etching, photo-resist stripping and inspection processes, and it has a complicated fabricating process.

SUMMARY

A liquid crystal display device of a horizontal electric field type and a fabricating method thereof is provided.

The liquid crystal display device of a horizontal electric field type comprises a plurality of gate lines provided on a lower substrate. Data lines cross in such a manner to insulate with the gate lines and to define a pixel area. A first short preventive hole is arranged between a (n−1)th gate line and a (n)th gate line of the plurality of gate lines. Wherein a pixel area is arranged in two rows between the (n)th gate line and a (n+1)th gate line of the plurality of gate lines.

The (n−1)th gate line and the (n)th gate line are symmetrical to each other on the basis of the first short preventive hole. The (n)th gate line and the (n+1)th gate line are symmetrical to each other on the basis of the pixel area.

The pixel area includes first and a second pixel areas, and the liquid crystal display device of horizontal electric field further includes a common line that forms a storage capacitor of the first pixel area and a storage capacitor of the second pixel area.

The liquid crystal display device of a horizontal electric field type further comprises a second short preventive hole provided between the pixel area and the gate line.

A method of fabricating a liquid crystal display device of a horizontal electric field type according to the present invention comprises the act of forming a gate pattern that includes a (n−1)th, a (n)th and a (n+1)th gate lines on a lower substrate; forming a gate insulating film that covers the gate pattern; forming a semiconductor pattern on the gate insulating film, and a source/drain pattern overlapped on the semiconductor pattern; forming a protective film that covers the source/drain pattern; and forming a first short preventive hole between the (n)th gate line and the (n−1)th gate line.

DRAWINGS

The following detailed description of the embodiments that makes reference to the accompanying drawings, in which.

Figure 5:
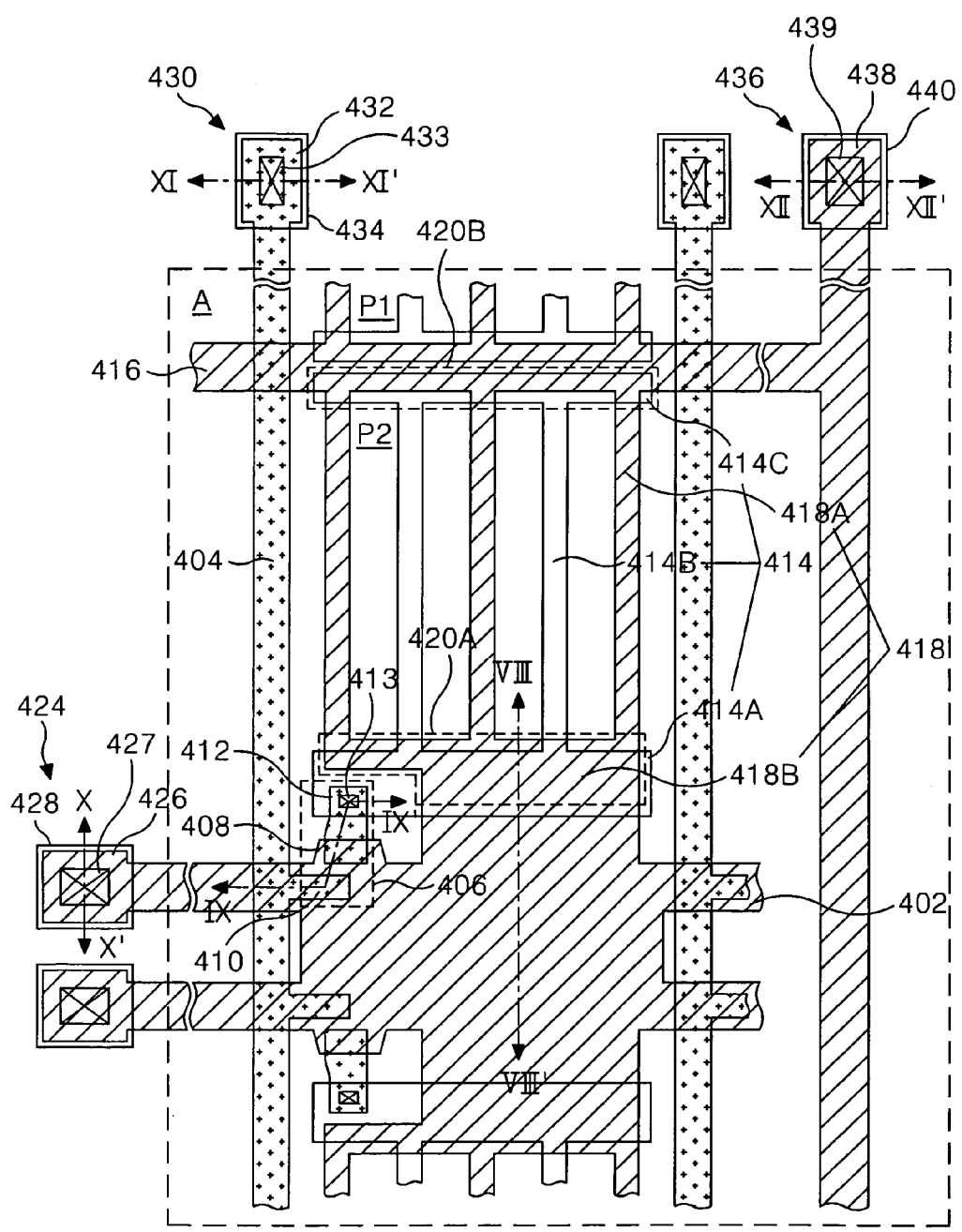
FIG. 5 is a sectional view amplified-showing the "A" area of the thin film transistor substrate in FIG. 4, and showing added to each pad portion.
Figure 6:
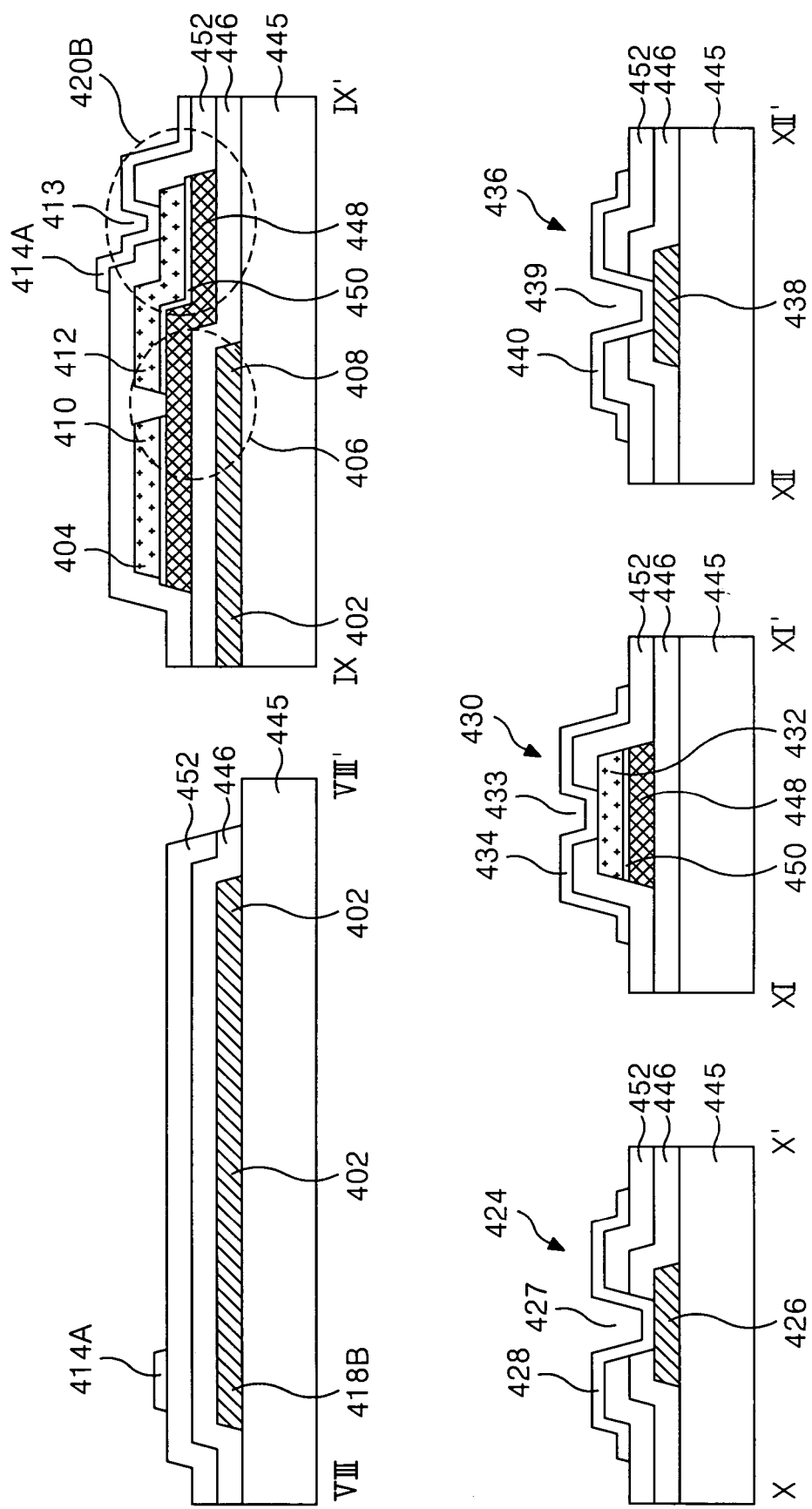
Figure 7:
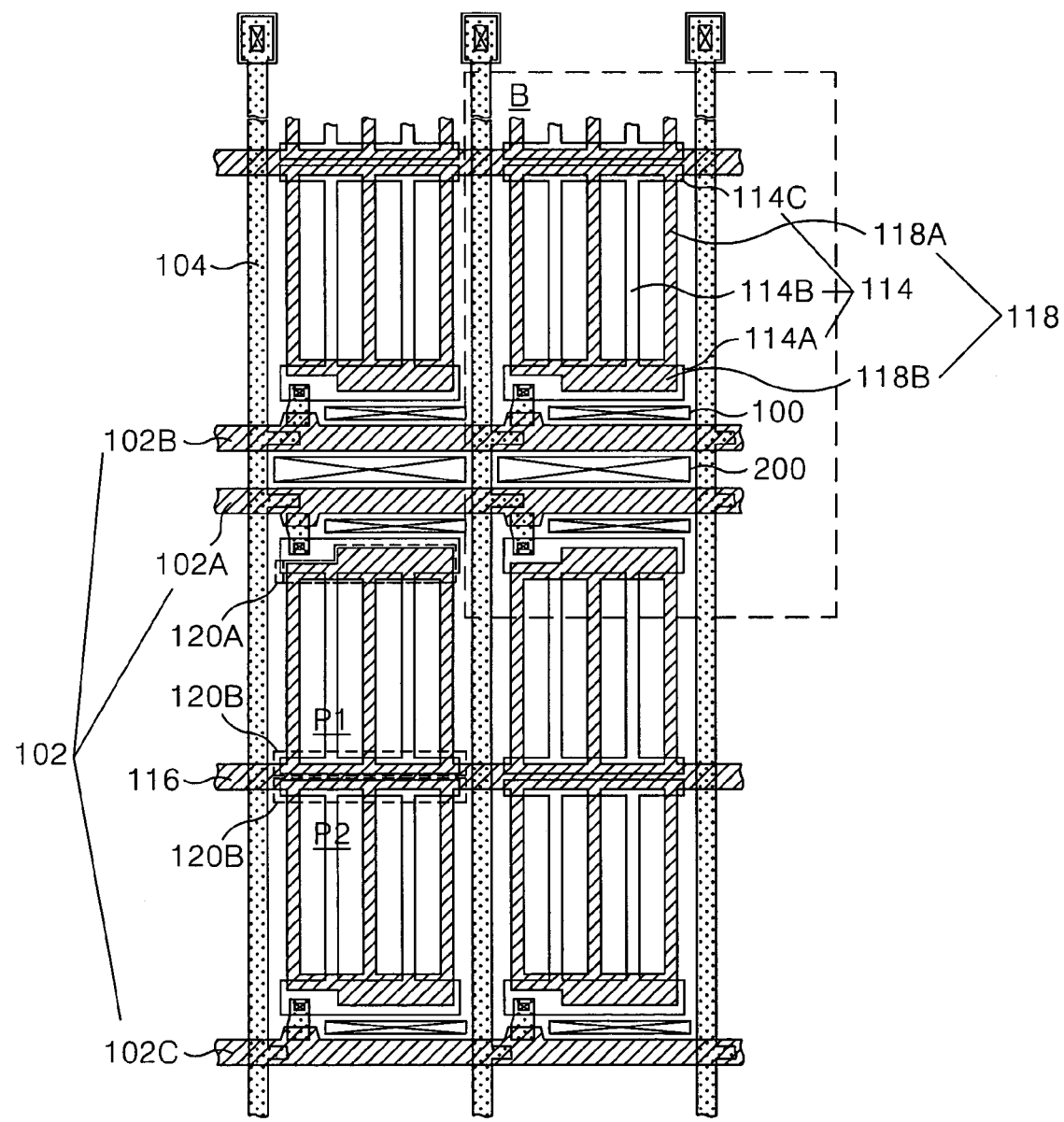
Figure 8:
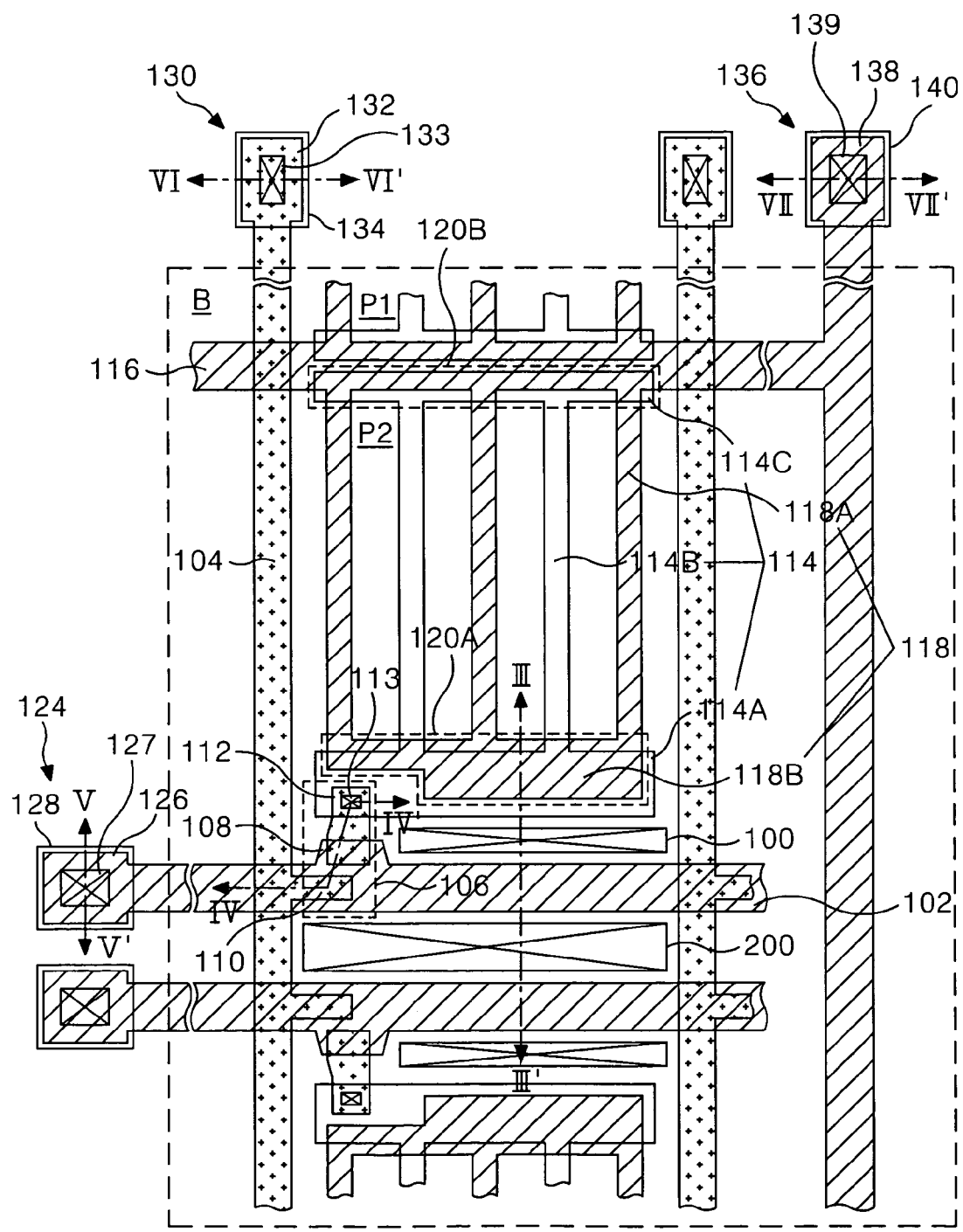
Figure 9:
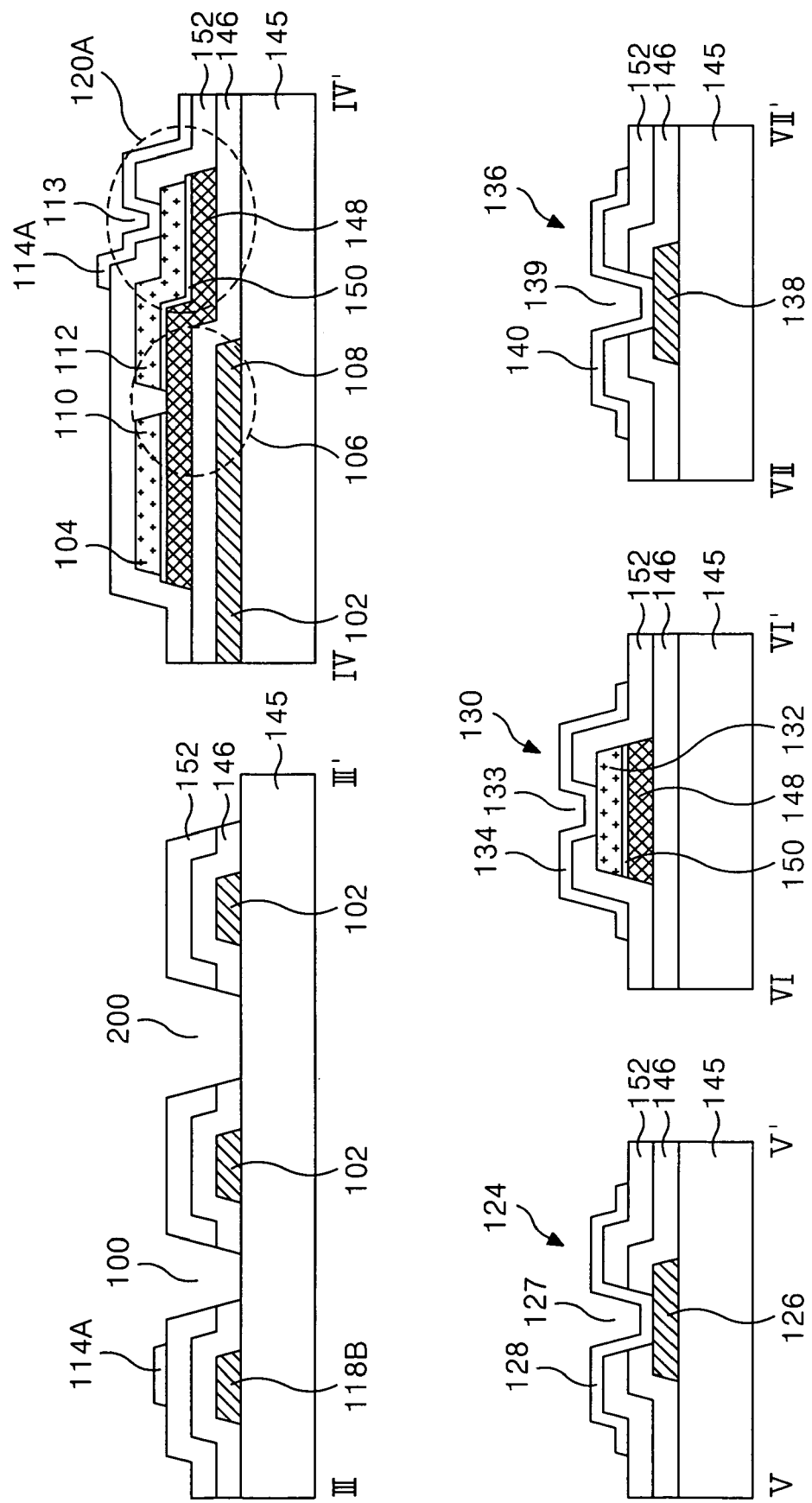
Figure 10A:
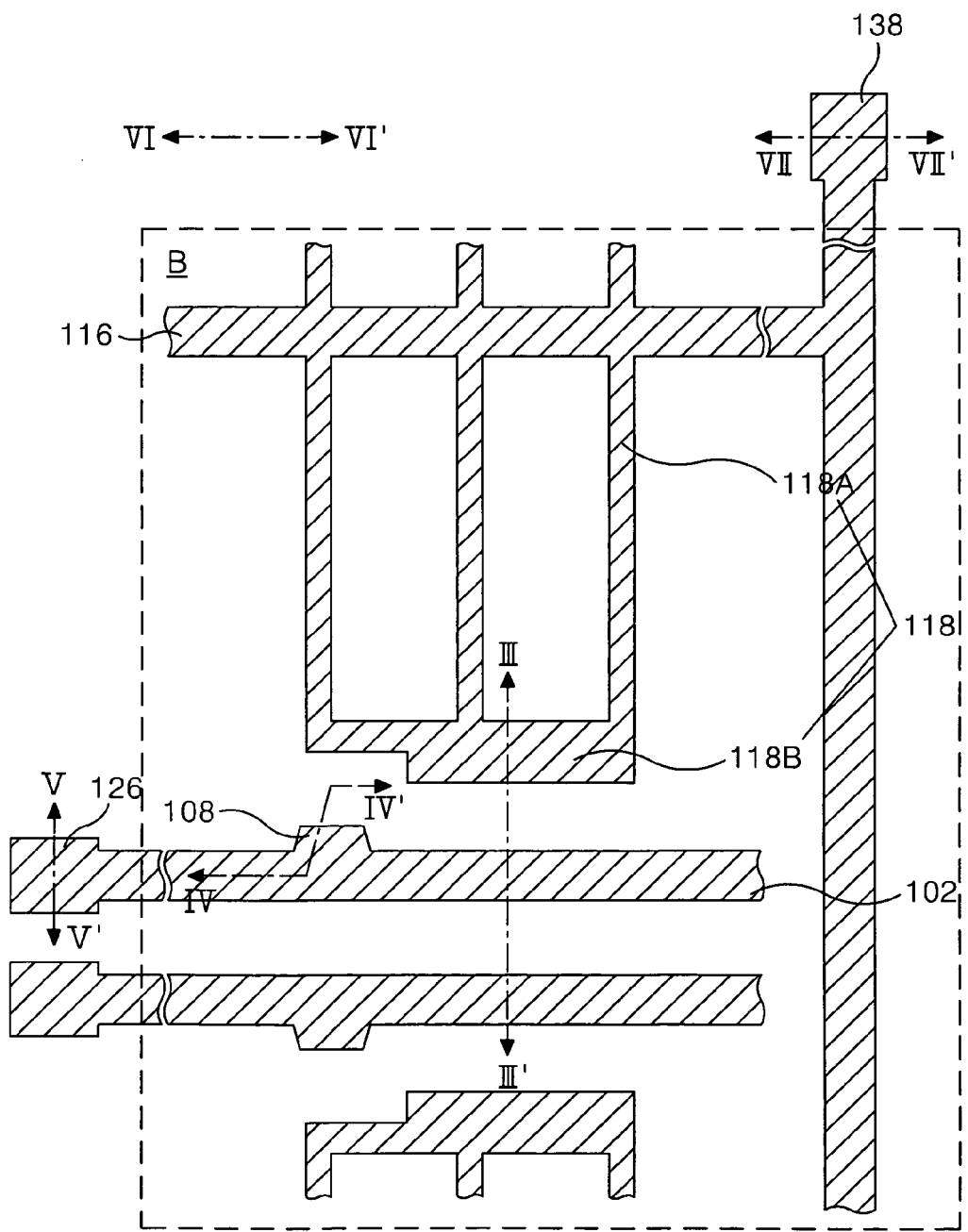
Figure 10B:
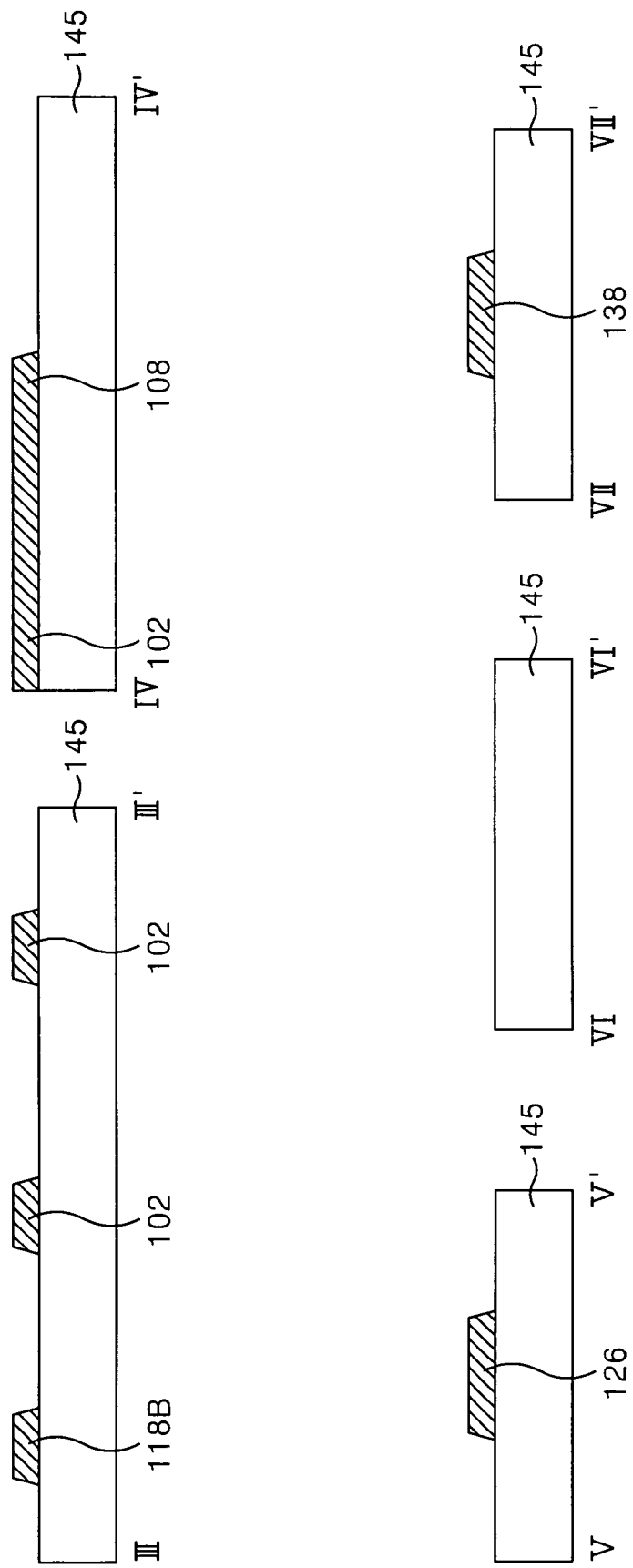
Figure 11A:
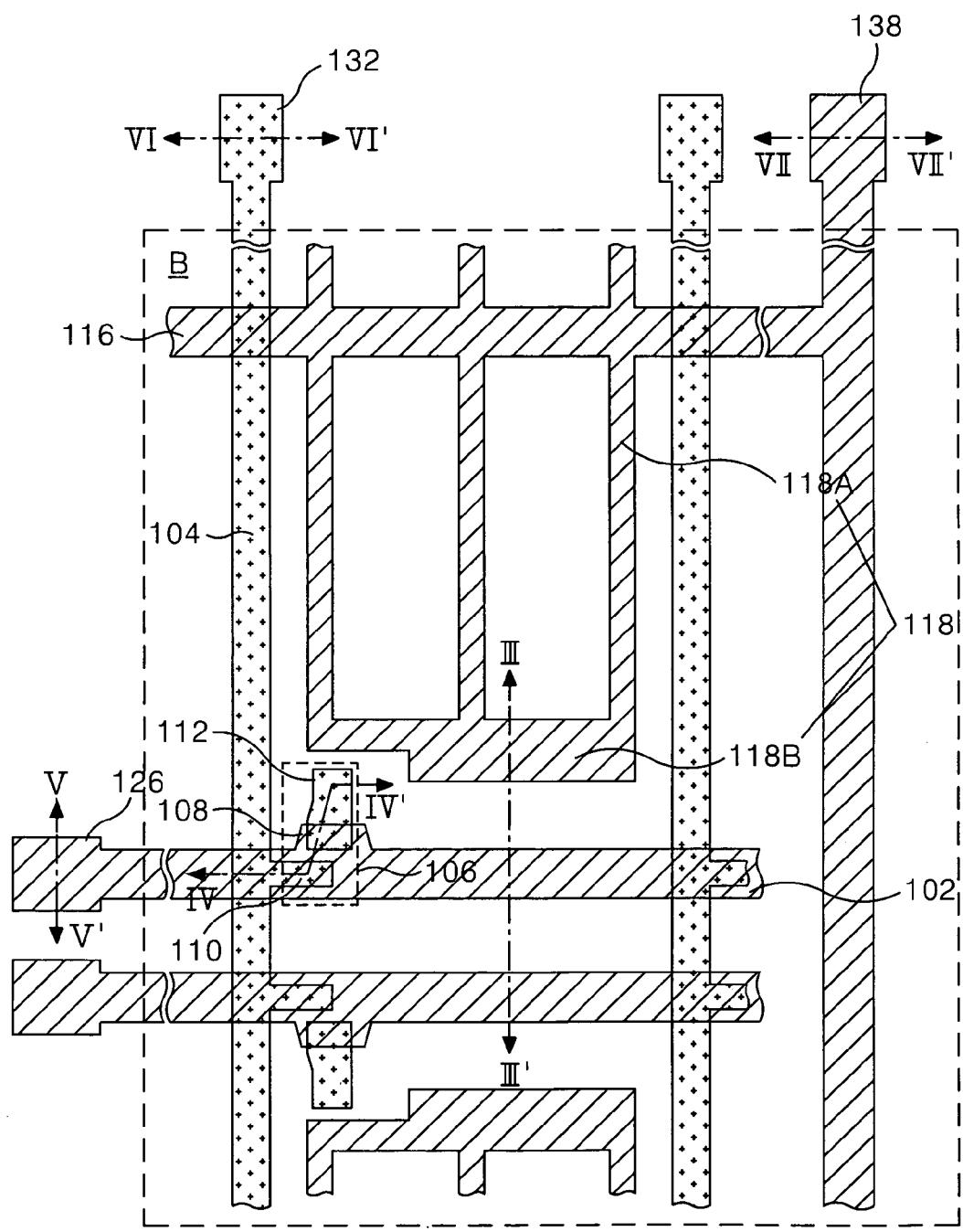
Figure 11B:
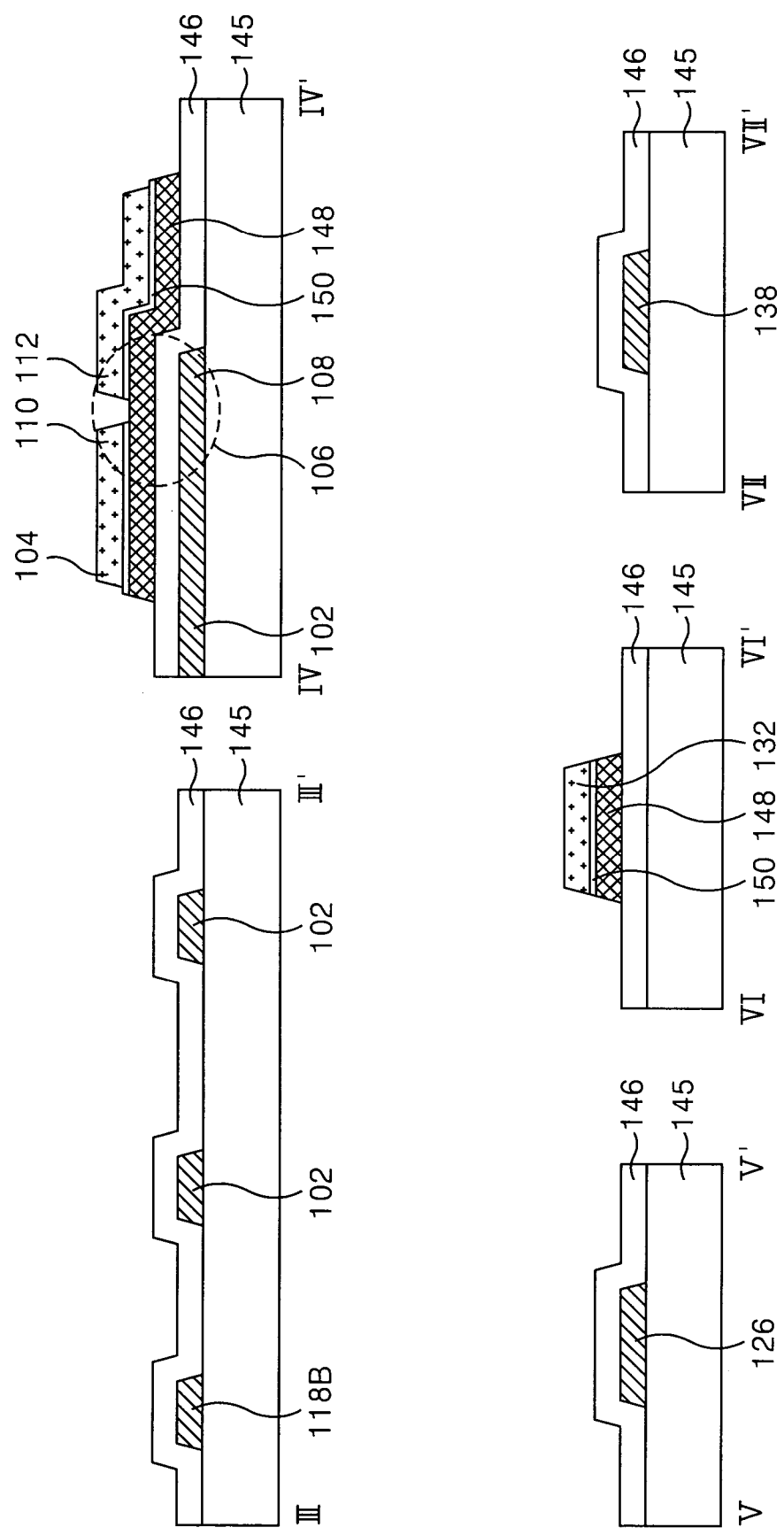
Figure 12A:
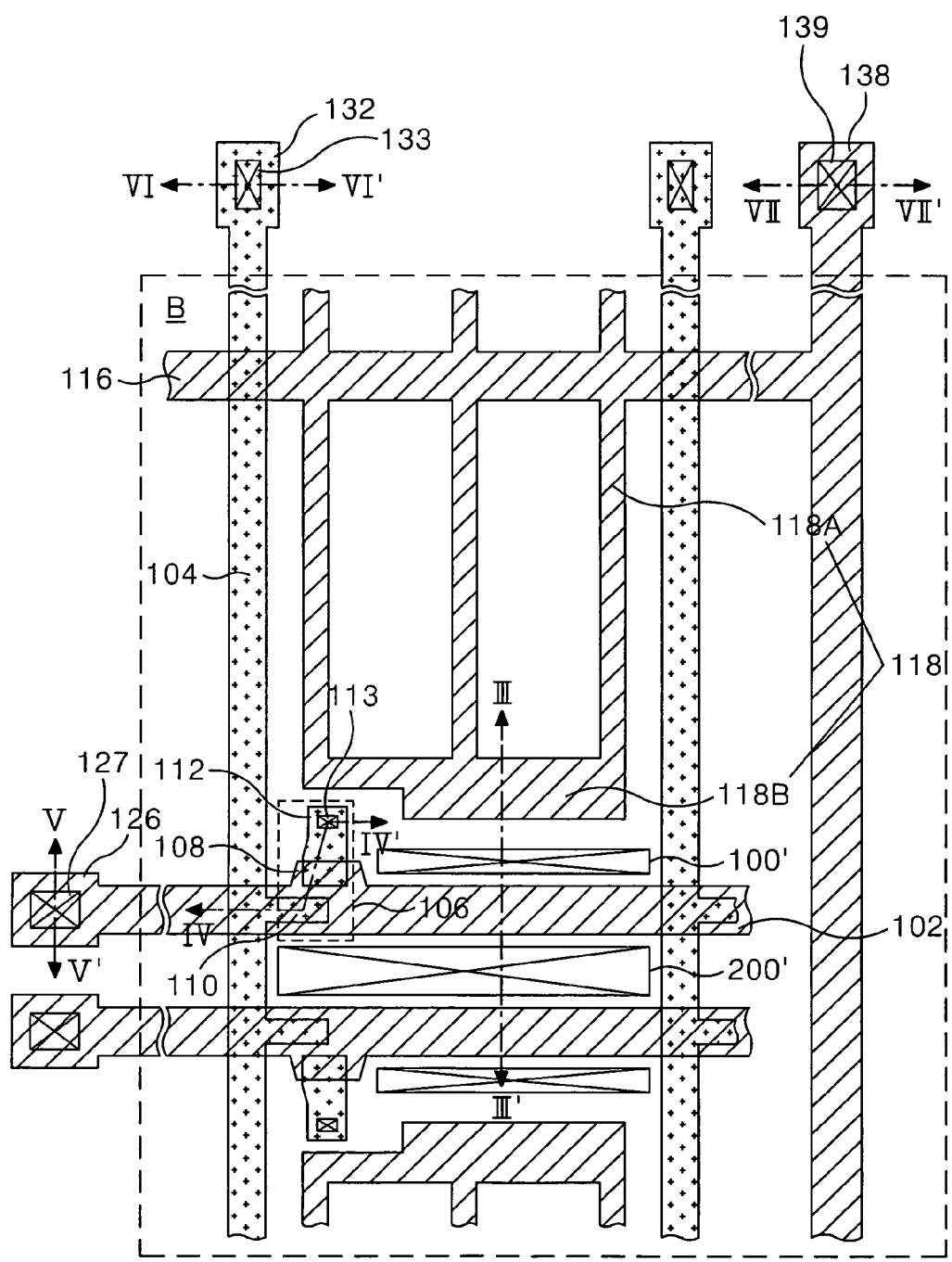
Figure 12B:
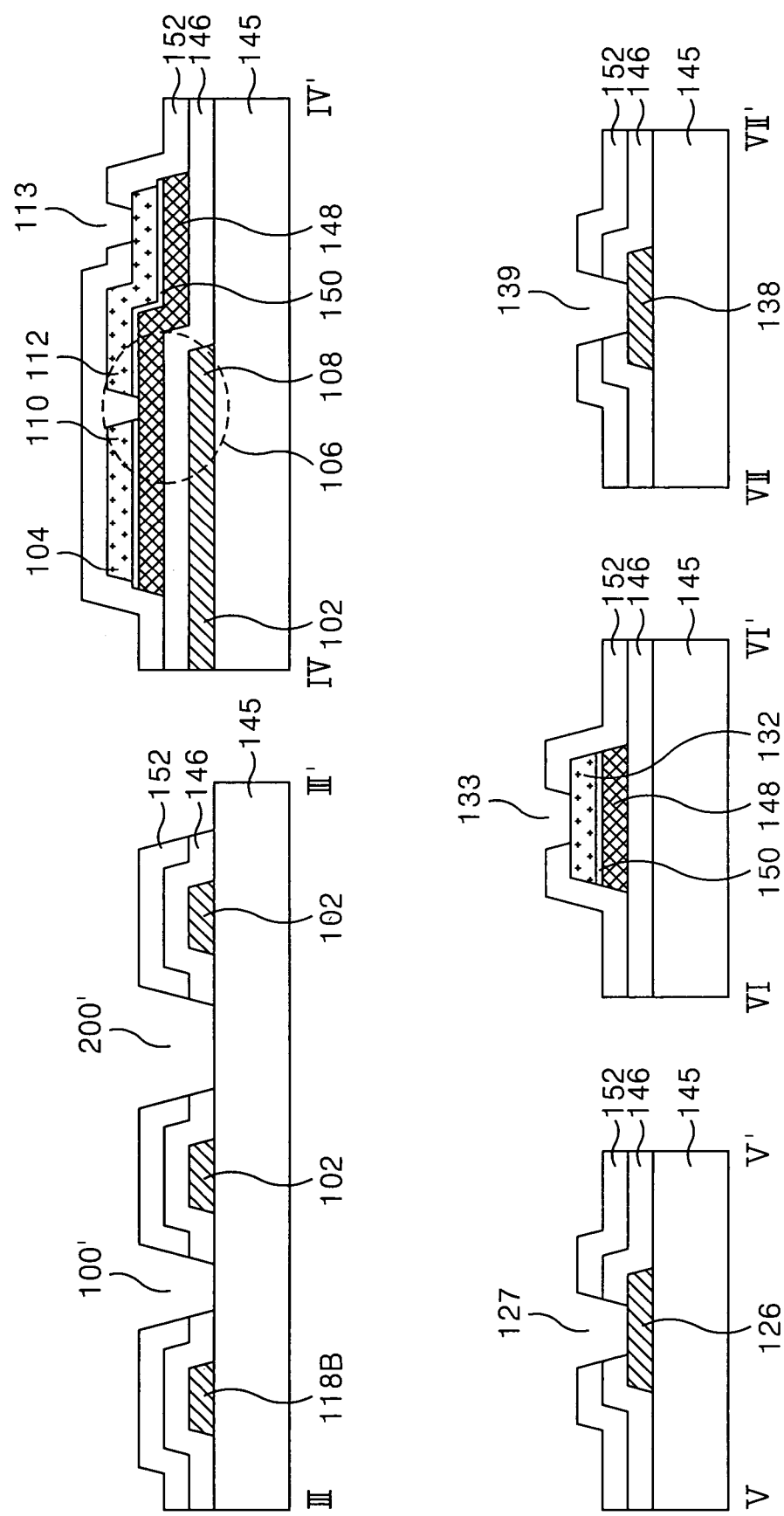
Figure 13A:
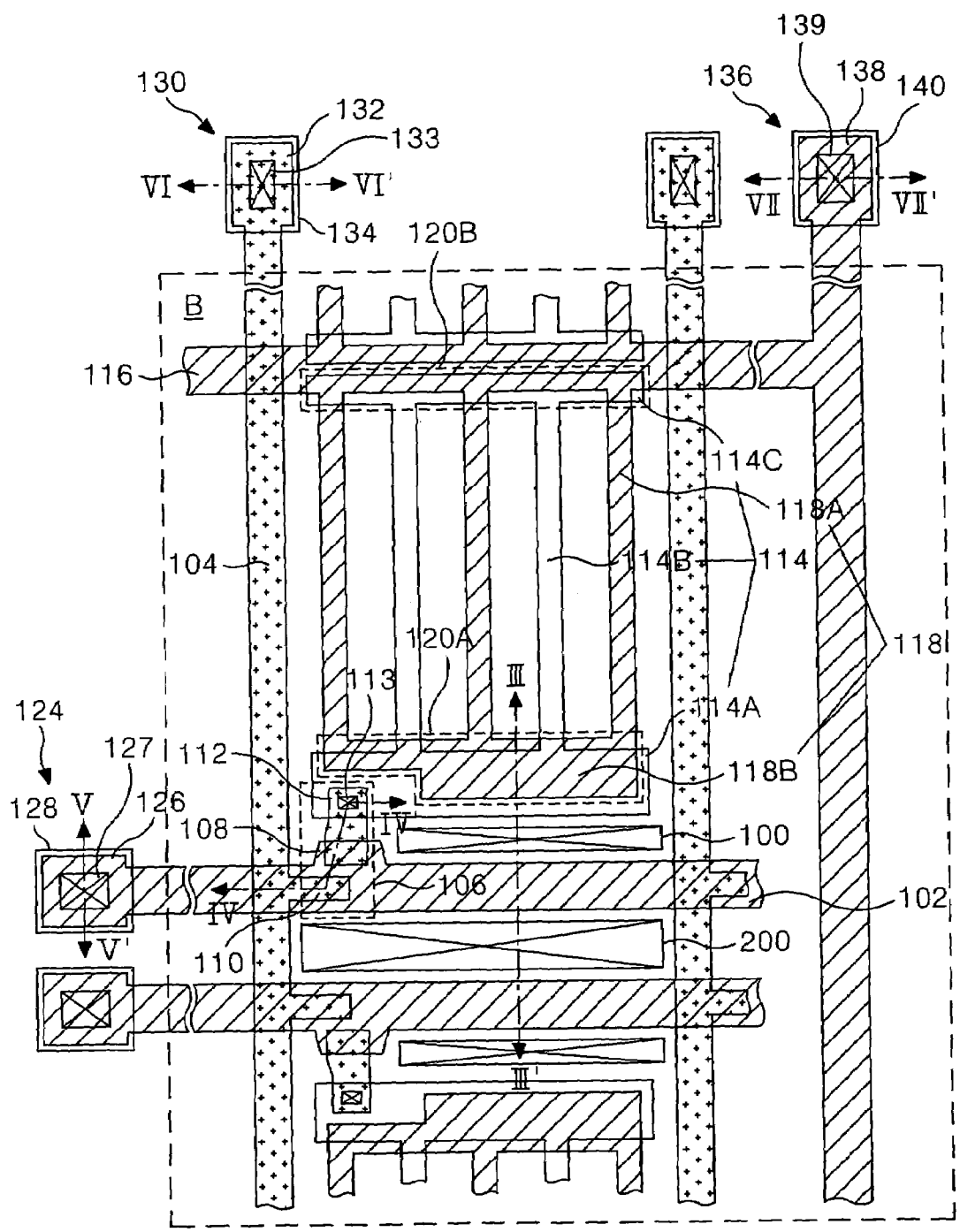
Figure 13B:
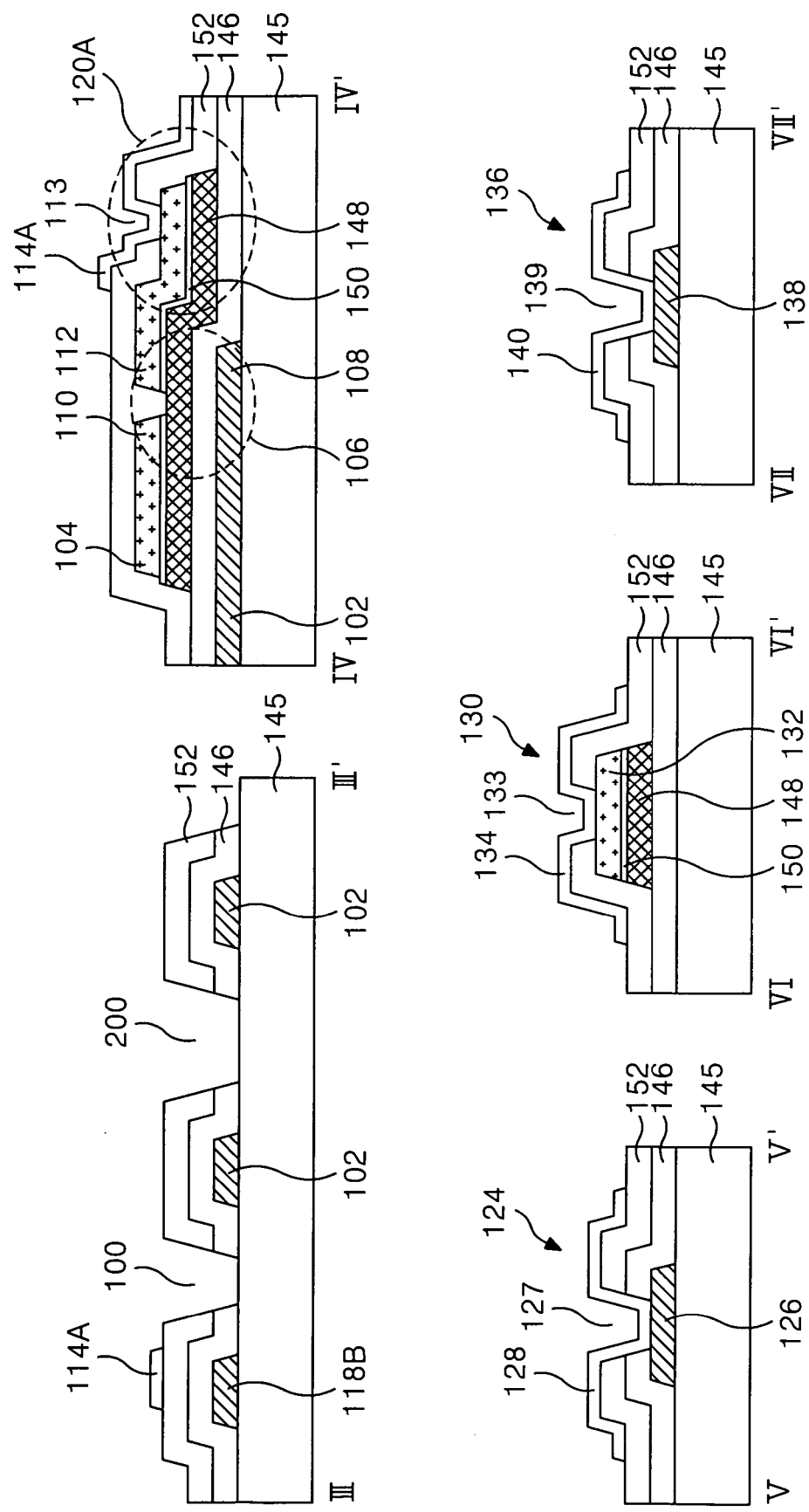
Figure 14A:
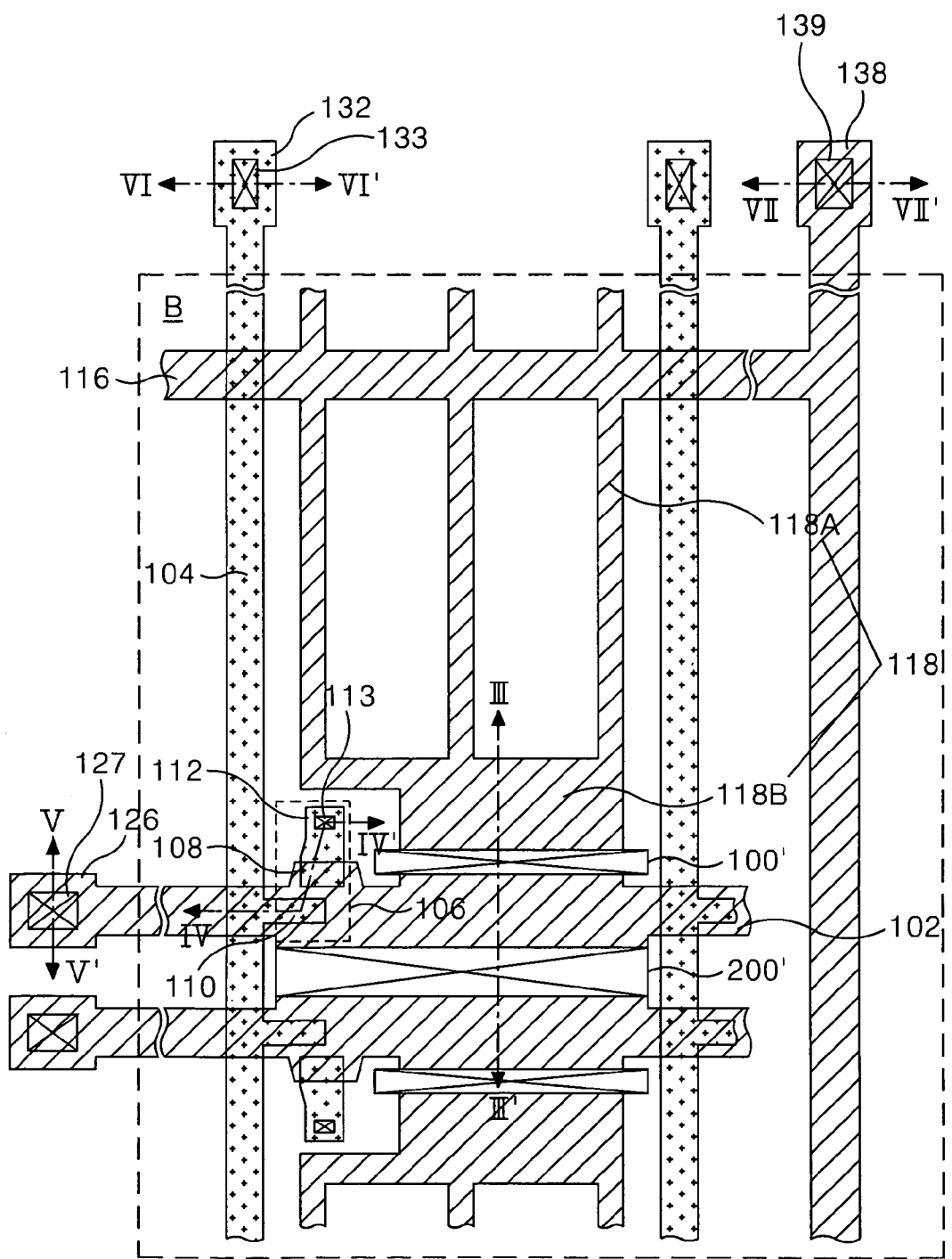
Figure 14B:
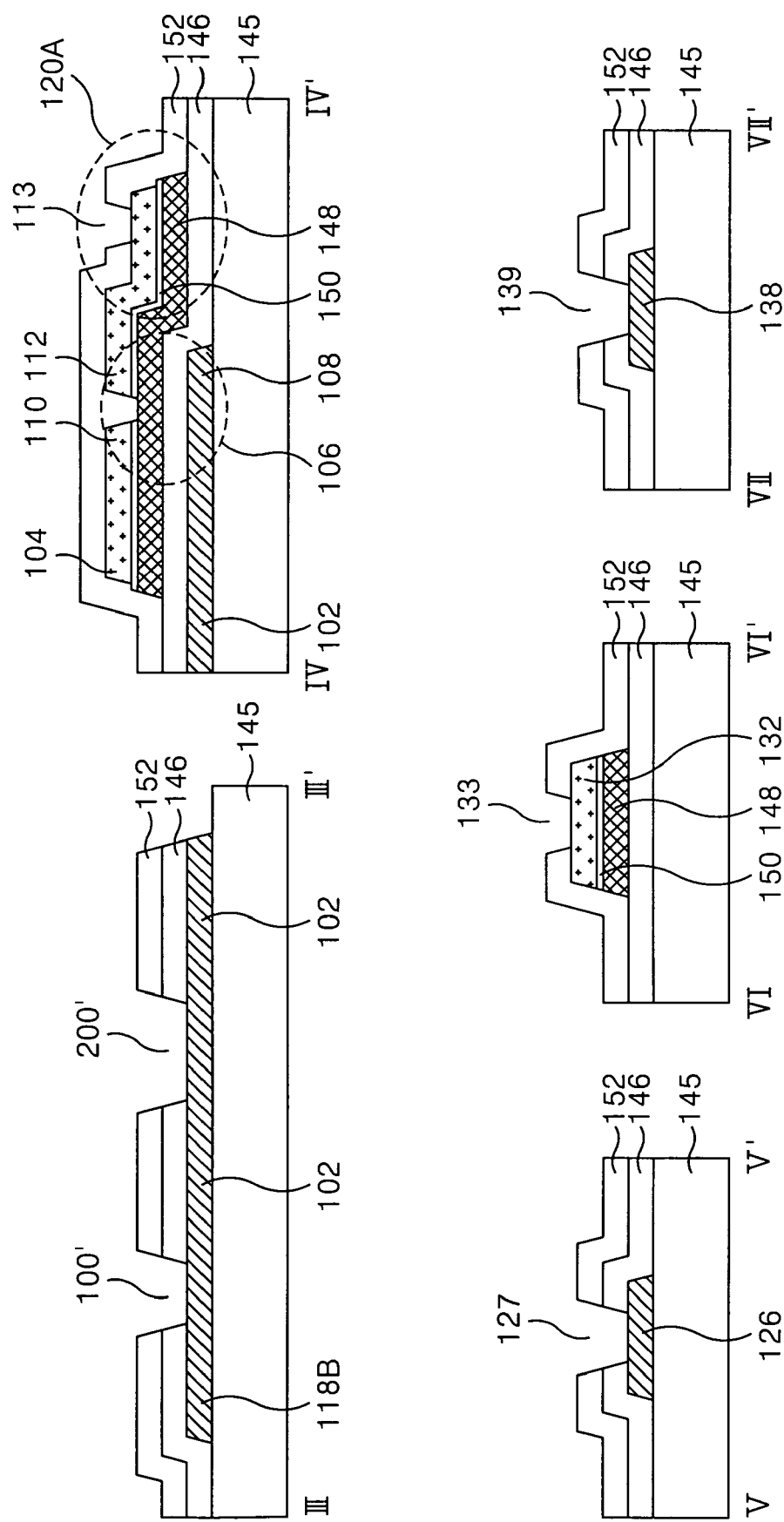
Figure 15A:
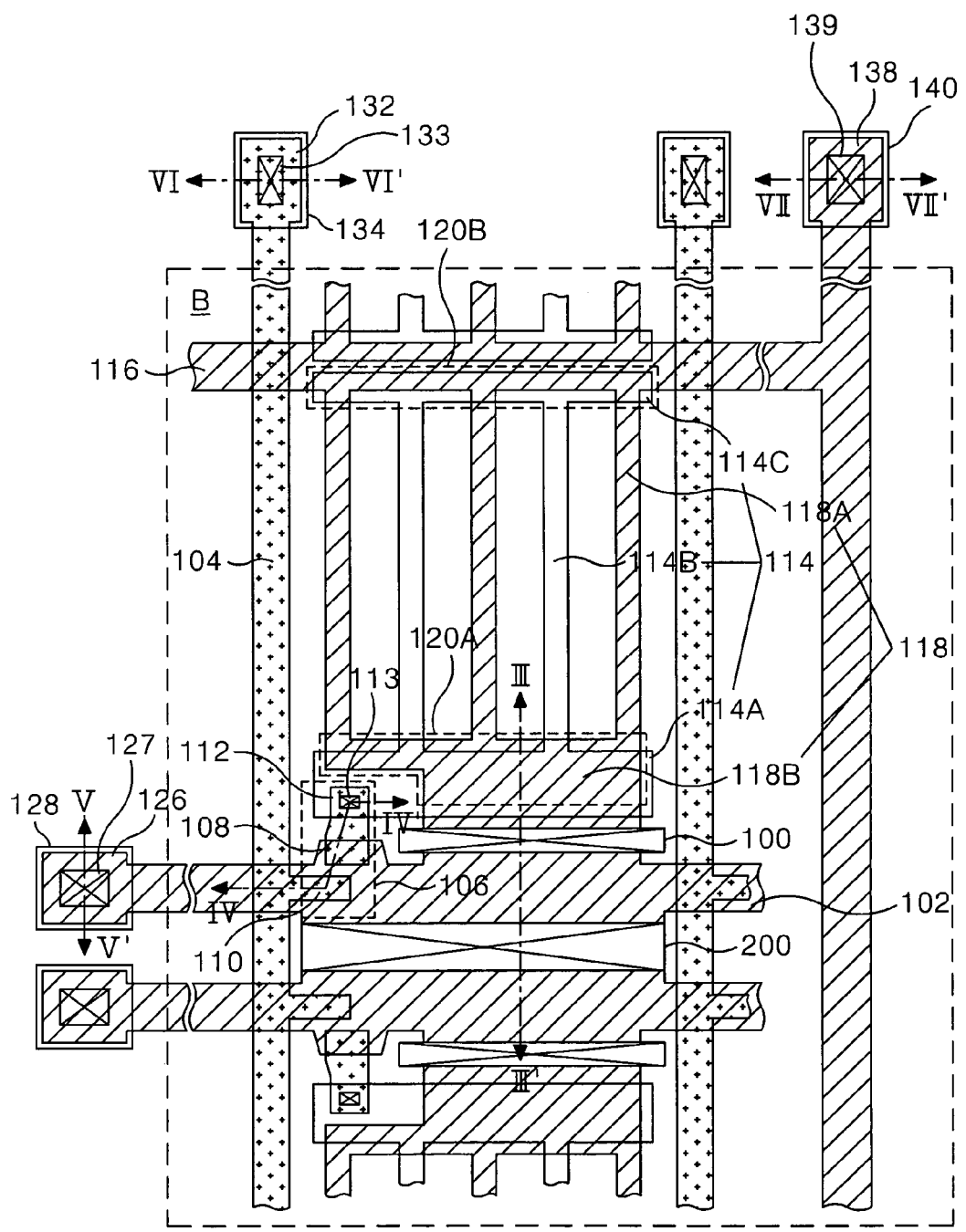
Figure 15B:
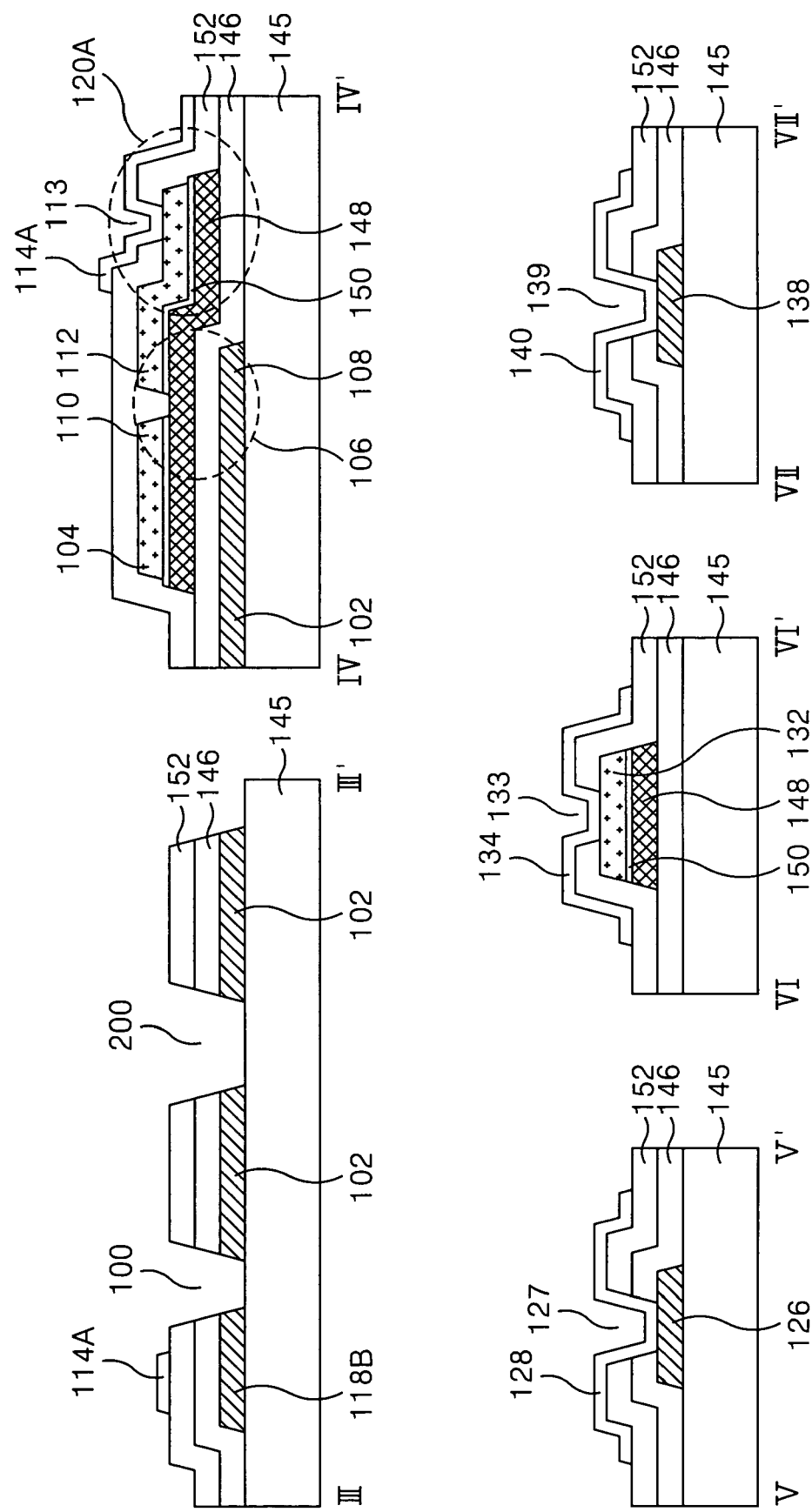

FIG. 6 is a section view of the thin film transistor substrate taken along the VIII-VIII'; IX-IX'; X-X'; XI-XI' and XII-XII' lines in FIG. 5;

FIG. 7 is a plan view that shows a portion of a thin film transistor substrate of a horizontal electric field type according to a third embodiment;

FIG. 8 is a section view amplified-showing of the "B" area of the thin film transistor substrate in FIG. 7, and showing added to each pad portion;

FIG. 9 is a section view of the thin film transistor substrate taken along the III-III', IV-IV', V-V', VI-VI' lines in FIG. 8;

FIG. 10A and FIG. 10B are a plan view and a section view that explain a first mask process in a method of fabricating the thin film transistor substrate according to a third embodiment;

FIG. 11A and FIG. 11B are a plan view and a section view, respectively, that explain a second mask process in a method of fabricating the thin film transistor substrate according to a third embodiment;

FIG. 12A and FIG. 12B are a plan view and a section view, respectively, that explain a third mask process in a method of fabricating the thin film transistor substrate according to a third embodiment;

FIG. 13A and FIG. 13B are a plan view and a section view, respectively, that explain a fourth mask process in a method of fabricating the thin film transistor substrate according to a third embodiment;

FIG. 14A and FIG. 14B are a plan view and a section view, respectively, that explain an effect of the thin film transistor substrate of a horizontal electric field type according to a third embodiment; and FIG. 15A and FIG. 15B are a plan view and a section view, respectively, that explains the effect of the thin film transistor substrate of a horizontal electric field type according to a third embodiment;

DESCRIPTION

Hereinafter, the preferred embodiments of the present invention will be described in detail with reference to FIG. 3 to FIG. 15B.

The liquid crystal display device of a horizontal electric field type drives a liquid crystal with a horizontal electric field between the pixel electrode and the common electrode that are arranged in parallel to each other on the lower substrate. The liquid crystal display device of a horizontal electric field type has an advantage of a wide viewing angle of approximately 160°. Hereinafter, the liquid crystal display device of horizontal electric field applying type will be described in detail.

A liquid crystal display device of a horizontal electric field type includes a thin film transistor substrate (lower substrate) and a color filter array substrates (upper substrate) that are opposed to each other and united. A spacer constantly keeps a cell gap between the two substrates. A liquid crystal fills in the cell gap.

Figure 1:
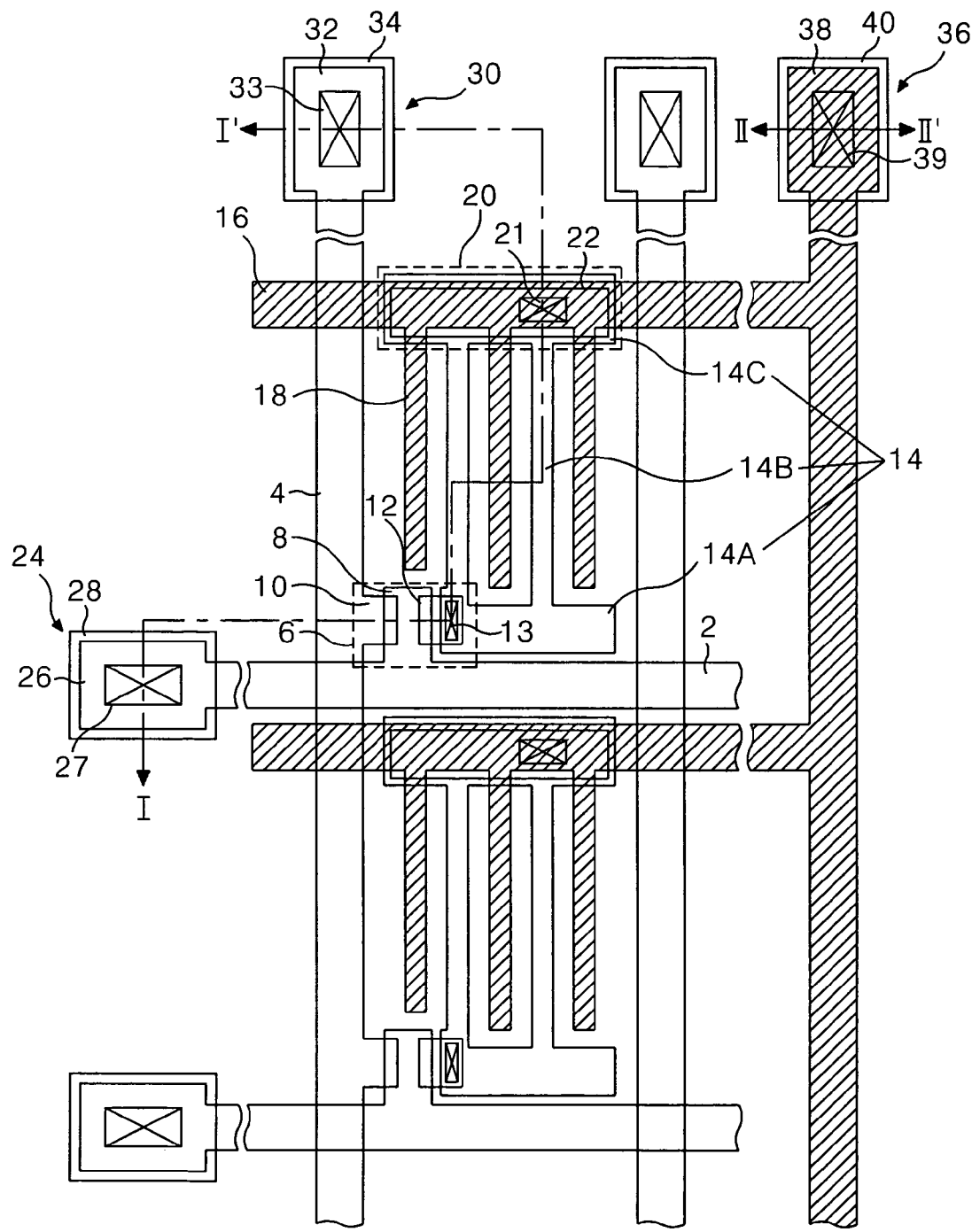
FIG. 1 is a plan view showing a portion of a related art thin film transistor substrate of a horizontal electric field type.
Figure 2:
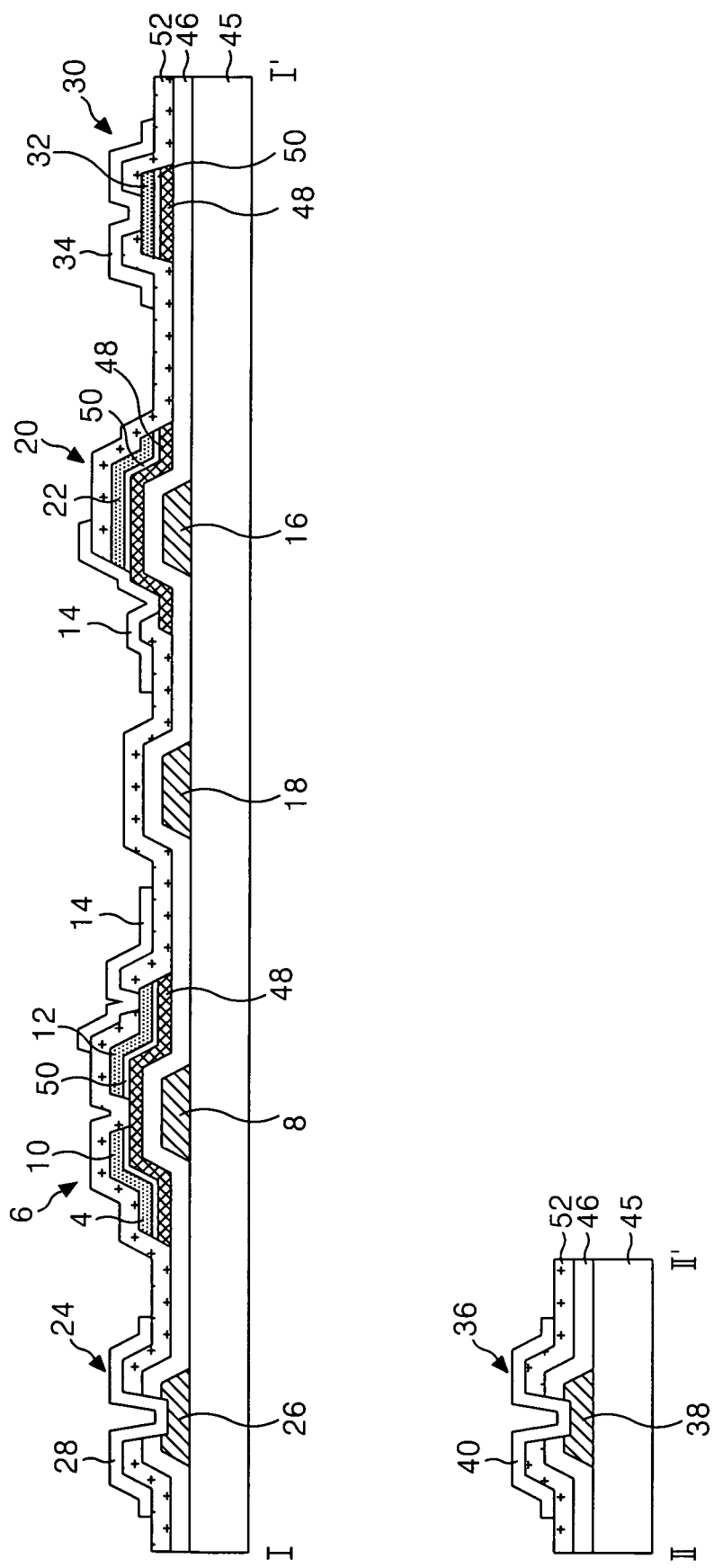
FIG. 2 is a section view of the thin film transistor substrate taken along the I-I' and II-II' lines in FIG. 1.
Figure 3:
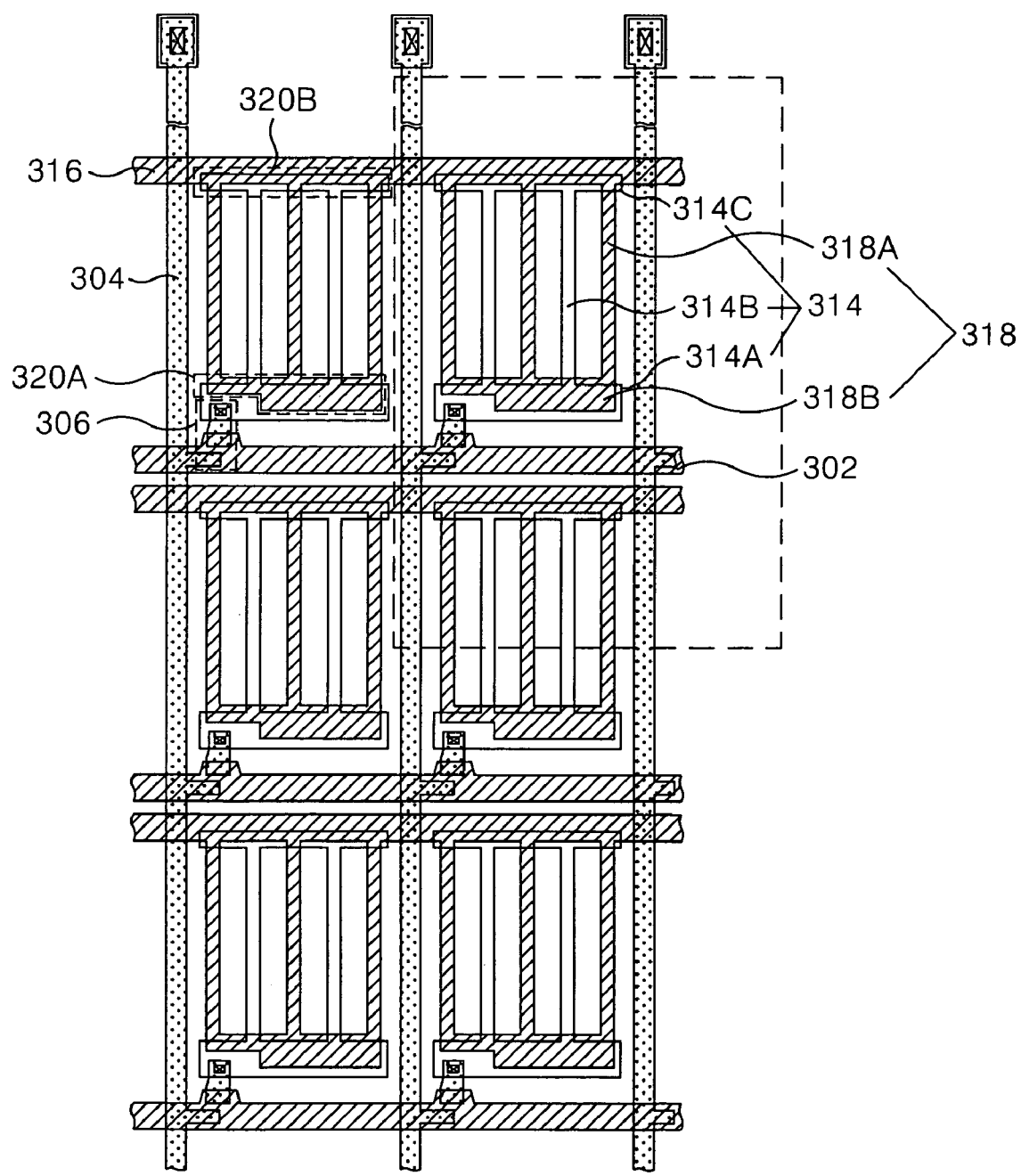
FIG. 3 is a plan view showing a portion of a thin film transistor substrate of a horizontal electric field type according to a first embodiment.

As shown in FIG. 3, the thin film transistor substrate of a horizontal electric field type includes a gate line 302 and a data line 304. The gate line 302 and the data line 304 intersect each other with a gate insulating film disposed between and define a pixel area. A thin film transistor 306 is connected to the gate line 302, the data line 304, a pixel electrode 318, a pixel electrode 314 and a common electrode 318 that are provided to form a horizontal electric field at the pixel area. A common line 316 is connected to the common electrode 318. The thin film transistor further includes a first and second storage capacitor 320A and 320B provided at an overlapping area between the common electrode 318 and the pixel electrode 314, and between the common line 316 and the pixel electrode 314, respectively.

The first and second storage capacitor 320A and 320B provided at one pixel area are connected in parallel with each other and thus it becomes possible to increase a capacitance of the storage capacitor.

The common electrode 318 and the common line 316 are formed from the same opaque metal on the same plane.

The common electrode 318, the common line 316 and the gate line 302 are formed from the same metal on the same plane and are simultaneously patterned by a photolithography process and an etching process. The wirings are simultaneously patterned, but the patterning of each wiring is not performed in a reliable manner and thus it becomes possible to generate a short between each wiring. To prevent a manufacturing productivity drop of a liquid crystal display device by such short generation, a space between the wirings is secured in the course of patterning the wirings, so that it becomes possible to obviate a generation of short. To prevent a manufacturing productivity drop of the liquid crystal display device by such short generation, a short inspection is performed after the wirings are patterned. And a next process only performs at a substrate in which a short between the wirings is not generated.

Figure 4:
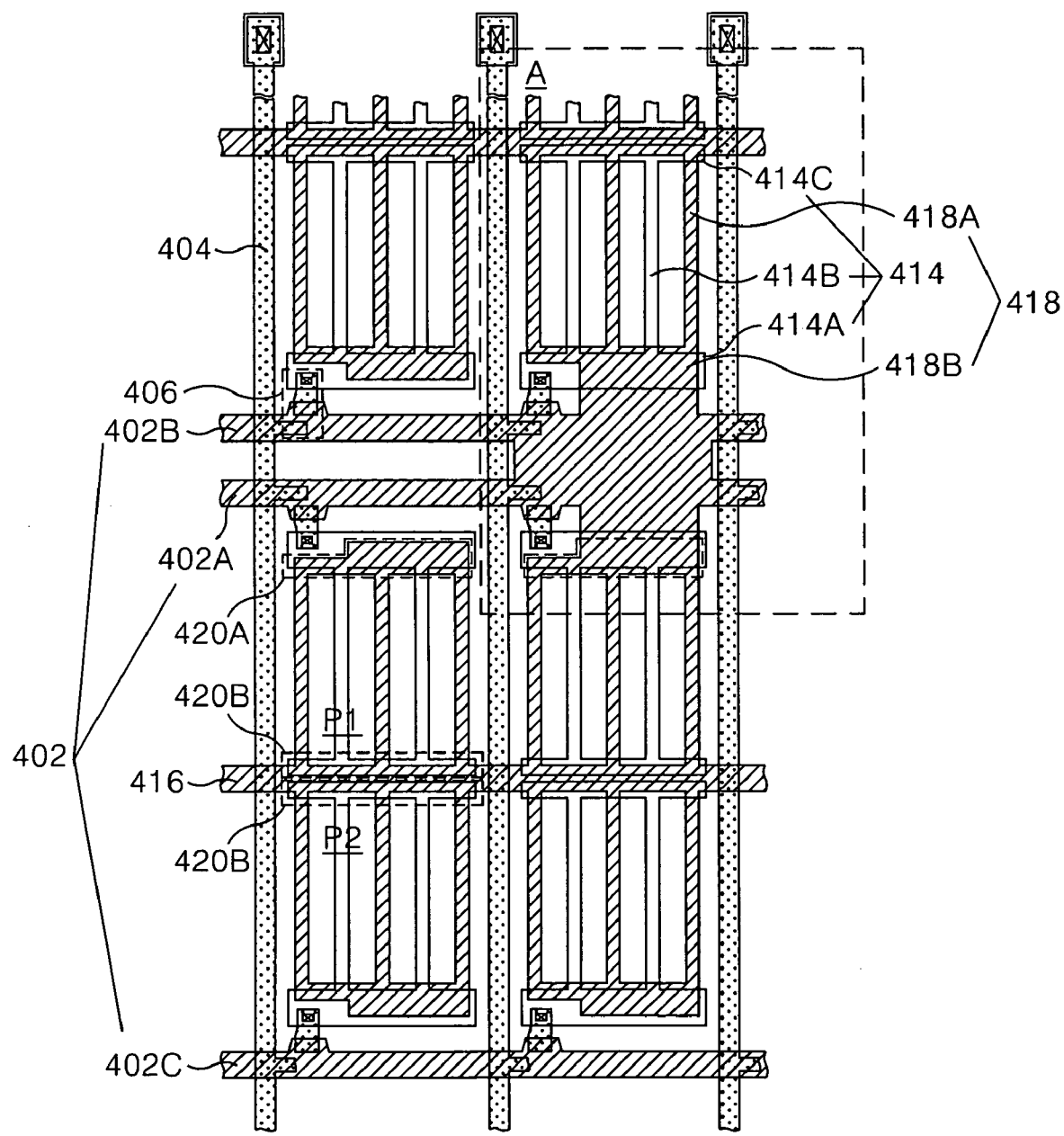
FIG. 4 is a plan view that shows a portion of a thin film transistor substrate of a horizontal electric field type according, to a second embodiment.

A detailed explanation of the second embodiment will be described in reference to FIG. 5 and FIG. 6. As shown in FIG. 4, the thin film transistor substrate of a horizontal electric field type includes a gate line 402 and a data line 404 provided in such a manner that intersects each other with a gate insulating film therebetween and defines a pixel area. A thin film transistor 406 is connected to the gate line 402, the data line 404, a pixel electrode 418, a pixel electrode 414 and a common electrode 418 that are provided to form a horizontal electric field at the pixel area. A common line 416 is connected to the common electrode 418. The thin film transistor further includes a first and second storage capacitor 420A and 420B, respectively, that are provided at an overlapping area between the common electrode 418 and the pixel electrode 414, and between the common line 416 and the pixel electrode 414.

The first and second storage capacitor 420A and 420B are provided at one pixel area and are connected in parallel with each other and thus it becomes possible to increase a capacitance of the storage capacitor.

In the second embodiment of the present invention, a (n)th (wherein k is an integer more than two) gate line 402A is formed in such a manner to adjoin with a (n−1)th gate line 402B. The (n)th gate line 402A is formed in such a manner to have a symmetry.

A (n+1)th gate line 402C is formed between the (n)th gate line 402A and a bifarious pixel area that includes a first and second pixel area P1 and P2, and is symmetrical with the (n)th gate line 402A on the bifarious pixel area basis.

A bifarious second storage capacitor 420B shares one common line 416 between the gate lines 402A and 402C and is symmetrical with the bifarious pixel areas P1 and P2 therebetween. The common line 414 that is identical to the first embodiment is formed from the opaque metal, but the bifarious second storage capacitor 420B is formed from one common line 414, so that it becomes possible to reduce a horizontal area that is formed from the opaque metal at the pixel area. An area of the common line 414 formed from the opaque metal at the pixel area is decreased and thus increases an area that transmits light, so that it becomes possible to improve an aperture ratio of the liquid crystal display device according to the second embodiment.

In the second embodiment the common electrode 418, the common line 416 and the gate line 402 are formed from the same metal on the same plane and are simultaneously patterned by a photolithography process and an etching process. In the above-mentioned first embodiment, a short inspection is performed after the wirings are patterned and thus it becomes possible to improve manufacturing productivity. In the second embodiment, it is a difficult to perform a short inspection after the wirings are patterned because the gate lines 402A and 402B are adjoined not having the pixel area therebetween because a bifarious second storage capacitor 420B is formed in such a manner to share one common line 416 in order to improve an aperture ratio in the liquid crystal display device according to the second embodiment.

In the second embodiment that includes the gate lines 402A and 40B adjoined to each other, it is difficult to connect exterior wirings for inspection between the wirings.

FIG. 5 is a plan view amplified-showing "A" area of the thin film transistor substrate in FIG. 4, and showing added to each pad portion, and FIG. 6 is a section view of the thin film transistor substrate taken along the VIII-VIII'; IX-IX'; X-X'; XI-XI' and XII-XII' lines in FIG. 5.

Referring to FIG. 5 and FIG. 6, the thin film transistor substrate of a horizontal electric field type includes a gate line 402 and a data line 404 provided in such a manner that intersects each other on a lower substrate 445 with a gate insulating film 446 therebetween and defines a pixel area. A thin film transistor 406 is connected to the gate line 402, the data line 404, a pixel electrode 418, a pixel electrode 414 and a common electrode 418 provided to form a horizontal electric field at the pixel area. A common line 416 is connected to the common electrode 418. The thin film transistor further includes a first and second storage capacitor 420A and 420B provided at an overlapping area between the common electrode 418 and the pixel electrode 414, and between the common line 416 and the pixel electrode 414. A gate pad 424 is connected to a gate line 402. A data pad 432 is connected to a data line 404 and a common pad 440 connected to a common line 416.

The gate line 402 supplies a scanning signal from a gate driver (not shown). The data line 404 supplies a video signal from a data driver (not shown). The gate line 402 and the data line 404 cross each other with a gate insulating film 446 therebetween to define each pixel area.

The thin film transistor 406 allows a video signal to be applied to the data line 404 to be charged into a pixel electrode 414 and be kept in response to a scanning signal applied to the gate line 402. The thin film transistor 406 includes a gate electrode included in the gate line 402. A source electrode 410 is connected to the data line 404. A drain electrode 412 is positioned in opposition to the source electrode 410 to be connected to a pixel electrode 414. An active layer 448 overlaps with the gate line 402 with the gate insulating film 446 therebetween to define a channel between the source electrode 410 and the drain electrode 412. An ohmic contact layer 450 is provided on the active layer 448 other than a channel that makes ohmic contact with the source electrode 410 and the drain electrode 412.

A semiconductor pattern includes the active layer 448 and the ohmic contact layer 450 that overlaps the data line 404 and a lower data pad electrode 434, and may disposed in such a manner to not overlap with the data line 404 and the lower data pad electrode 434 (not shown).

The common line 416 and the common electrode 418 supply a reference voltage for driving the liquid crystal, that is, a common voltage to each pixel. The common line 416 is formed in parallel to the gate line 402 with the bifarious pixel area therebetween. Such common line 416 is simultaneously formed from the same metal as the gate line 402 on the same plane.

The common electrode 418 is connected to the common line 416 at each pixel area. The common electrode 418 includes a finger portion 418A extended from the common line 418 into the pixel area, a horizontal portion 418B connected to the finger portion 418A. The common electrode 418 is simultaneously formed from the same metal on the same plane.

The pixel electrode 414 is connected to the drain electrode 412 of the thin film transistor 406, and is disposed to form a horizontal electric field along with the common electrode 418 at each pixel area. The pixel electrode 414 includes a first horizontal portion 414A that is provided in parallel to the gate line 402 that is connected to the drain electrode that is exposed through a first contact hole 413. A second horizontal portion 414C is provided in such a manner to overlap with the common line 416 and a finger portion 414B that are connected between the first and second horizontal portion 414A and 414C to be provided in parallel to the finger portion 418A of the common electrode 418. If a video signal is applied, via the thin film transistor 406, to the pixel electrode 414, then a horizontal electric field is formed between the finger portion 414B of the pixel electrode 414 and the finger portion 418A of the common electrode 418 supplied with the common voltage via the common line 416. Liquid crystal molecules that are arranged in the horizontal direction between the thin film transistor array substrate and the color filter array substrate by such a horizontal electric field are rotated due to a dielectric anisotropy. Transmittance of a light that is transmitted the pixel area is differentiated depending upon a rotation extent of the liquid crystal molecules, thereby implementing a gray level scale.

A storage capacitor includes a first storage capacitor 420A provided such that the first horizontal portion 414A of the pixel electrode 414 is overlapped with the horizontal portion 418B of the common electrode 418 with a protective film 452 and the gate insulating film 446 therebetween. A second storage capacitor 420B is provided such that the second horizontal portion 414B of the pixel electrode 414 is overlapped with the common line 416 with the protective film 452 and the gate insulating film 446 therebetween.

The storage capacitor allows a pixel signal that is charged in the pixel electrode 414 to be stably maintained until the next pixel signal is charged.

The gate line 402 is connected, via the gate pad 424, to the gate driver (not shown). The gate pad 424 includes a lower gate pad electrode 426 extended from the gate line 402, and an upper gate pad electrode 428 that is connected to the lower gate pad electrode 426 exposed through a second contact hole 427 that passes through the gate insulating film 446 and the protective film 452.

The data line 404 is connected, via the data pad 430, to a data driver (not shown). The data pad 430 includes a lower data pad electrode 432 extended from the data line 404 along with semiconductor patterns 450 and 448 under it. An upper data pad electrode 434 is connected to the lower data pad electrode 432 exposed through a third contact hole 433 that passes through the protective film 452. The semiconductor patterns 450 and 448 may be not be provided on the lower surface of the data line 404, and the lower data pad electrode 432 may not include the semiconductor patterns 450 and 448.

The common line 416 receives a reference voltage from a common voltage source (not shown) via the common pad 436. The common pad 436 includes a lower common pad electrode 438 that is extended from the common line 416. An upper common pad electrode 440 is connected to the lower common pad electrode 438 that is exposed through a fourth contact hole 439 that passes through the gate insulating film 446 and the protective film 452.

In the thin film transistor substrate of a horizontal electric field type according to the second embodiment, the common electrode 418, the common line 416 and the gate line 402 are simultaneously formed from the same metal on the same plane. The process is continued without a short inspection in the second embodiment because it is a difficult to perform a short inspection between the wirings.

FIG. 7 is a plan view for briefly explaining a portion of a thin film transistor substrate of horizontal electric field applying type according to a third embodiment of the present invention.

As shown in FIG. 7, the thin film transistor substrate of horizontal electric field applying type includes a gate line 102 and a data line 104 provided in such a manner to intersect each other with a gate insulating film therebetween. The gate line 102 and the data line 104 define a pixel area. A thin film transistor 106 is connected to the gate line 102, the data line 104, a pixel electrode 118, a pixel electrode 114 and a common electrode 118 that are provided to form a horizontal electric field at the pixel area. A common line 116 is connected to the common electrode 118. The thin film transistor further includes a first and second storage capacitor 120A and 120B provided at an overlapping area between the common electrode 118 and the pixel electrode 114, and between the common line 116 and the pixel electrode 114, respectively.

The first and second storage capacitor 120A and 120B that are provided at one pixel area are connected in parallel with each other and thus it becomes possible to increase a capacitance of the storage capacitor.

In the third embodiment, a (n)th gate line 102A is formed in such a manner to adjoin with a (n−1)th gate line 102B, and is formed in such a manner to have a symmetry on a first short preventive hole 200 basis. The first short preventive hole 200 prevents a short generated in a process in which the (n)th gate line 102A and the (n−1)th gate line 102B are patterned.

The (n)th gate line 102A is formed with the bifarious pixel area that includes the (n+1)th gate line 102C and the first and second pixel areas P1 and P2 therebetween. The (n)th gate line is also formed in such a manner to have symmetry on the first and second pixel areas P1 and P2 basis.

A bifarious second storage capacitor 120B shares one common line 116 between the gate lines 102A and 102C formed in such a manner to symmetrize with the bifarious pixel areas P1 and P2 therebetween. The common line 114 that is identical to the first embodiment is formed from the opaque metal, but the bifarious second storage capacitor 120B is formed from one common line 114 and thus it becomes possible to reduce a horizontal area that is formed from the opaque metal at the pixel area. An area of the common line 114 formed from the opaque metal at the pixel area is decreased, thereby increasing an area that transmits light and thus it becomes possible to improve an aperture ratio of the liquid crystal display device according to the third embodiment.

In the third embodiment, which is similar to the second embodiment, a short is generated between the horizontal portion 118B of the common electrode 118 and the (n+1)th gate line 102C, and the (n)th gate line 102A and the (n−1)th gate line 102B that adjoin with each other. The third embodiment further includes a first short preventive hole 200 and a second short preventive hole 100, so that it becomes possible to prevent a phenomenon in which a short is generated between the wirings.

The second short preventive hole 100 is formed between the horizontal portion 118B of the common electrode 118 and the (n−1)th gate line 102B, and the first short preventive hole 200 that is formed between the (n)th gate line 102A and the (n−1)th gate line 102B.

FIG. 8 is a plan view amplified-showing "B" area of the thin film transistor substrate in FIG. 7 and showing added to each pad portion, and FIG. 9 is a section view of the thin film transistor substrate taken along the III-III', IV-IV', V-V', VI-VI', VII-VII' lines in FIG. 8.

As shown in FIG. 8 and FIG. 9, the thin film transistor substrate of a horizontal electric field type includes a gate line 102 and a data line 104 provided in such a manner to intersect each other on a lower substrate 145 with a gate insulating film 146 therebetween and define a pixel area, a thin film transistor 106 is connected to the gate line 102, the data line 104, a pixel electrode 118, a pixel electrode 114 and a common electrode 118 that are provided to form a horizontal electric field at the pixel area. A common line 116 is connected to the common electrode 118. The thin film transistor further includes a first and second storage capacitor 120A and 120B provided at an overlapping area between the common electrode 118 and the pixel electrode 114, and between the common line 116 and the pixel electrode 114, a gate pad 124 connected to a gate line 102, a data pad 132 that is connected to a data line 104 and a common pad 140 connected to a common line 116.

The gate line 102 supplies a scanning signal from a gate driver (not shown). The data line 104 supplies a video signal from a data driver (not shown). The gate line 102 and the data line 104 cross each other with a gate insulating film 146 therebetween. The gate line 102 and the data line 104 define each pixel area.

The thin film transistor 106 allows a video signal that is applied to the data line 104 to be charged into a pixel electrode 114 and be kept in response to a scanning signal applied to the gate line 102. The thin film transistor 106 includes a gate electrode included in the gate line 102. A source electrode 110 is connected to the data line 104, a drain electrode 112 that is positioned in opposition to the source electrode 110 to be connected to a pixel electrode 114. An active layer 148 overlaps with the gate line 102 with the gate insulating film 146 therebetween to define a channel between the source electrode 110 and the drain electrode 112. An ohmic contact layer 150 is provided on the active layer 148 other than a channel that makes an ohmic contact with the source electrode 110 and the drain electrode 112.

A semiconductor pattern that includes the active layer 148 and the ohmic contact layer 150 is formed in such a manner to overlap with the data line 104 and a lower data pad electrode 134. The semiconductor pattern may be formed in such a manner to not overlap with the data line 104 and the lower data pad electrode 134 (not shown).

The common line 116 and the common electrode 118 supplies a reference voltage that drives the liquid crystal, that is, a common voltage to each pixel.

The common line 116 is formed in parallel to the gate line 102 with the bifarious pixel area therebetween. Such common line 116 is simultaneously formed from the same metal in similarity to the gate line 102 on the same plane.

The common electrode 118 is connected to the common line 116 at each pixel area. The common electrode 118 includes a finger portion 118A extended from the common line 118 into the pixel area. A horizontal portion 118B is connected to the finger portion 118A. The common electrode 118 is simultaneously formed from the same metal on the same plane.

The pixel electrode 114 is connected to the drain electrode 112 of the thin film transistor 106, and is provided in such a manner to form a horizontal electric field along with the common electrode 118 at each pixel area. The pixel electrode 114 includes a first horizontal portion 114A provided in parallel to the gate line 102 to be connected to the drain electrode exposed through a first contact hole 113. A second horizontal portion 114C provided in such a manner to overlap with the common line 116 and a finger portion 114B connected between the first and second horizontal portion 114A and 114C to be provided in parallel to the finger portion 118A of the common electrode 118. If a video signal is applied, via the thin film transistor 106, to the pixel electrode 114, then a horizontal electric field is formed between the finger portion 114B of the pixel electrode 114 and the finger portion 118A of the common electrode 118 supplied with the common voltage via the common line 116. Liquid crystal molecules that are arranged in the horizontal direction between the thin film transistor array substrate and the color filter array substrate by such a horizontal electric field are rotated due to a dielectric anisotropy. Light that is transmitted to the pixel area is differentiated depending upon a rotation extent of the liquid crystal molecules, thereby implementing a gray level scale.

A storage capacitor includes a first storage capacitor 120A provided such that the first horizontal portion 114A of the pixel electrode 114 is overlapped with the horizontal portion 118B of the common electrode 118 with having a protective film 152 and the gate insulating film 146 therebetween. A second storage capacitor 120B is provided such that the second horizontal portion 114B of the pixel electrode 114 is overlapped with the common line 116 with the protective film 152 and the gate insulating film 146 therebetween.

The storage capacitor allows a pixel signal that is charged in the pixel electrode 114 to be stably maintained until the next pixel signal is charged.

The gate line 102 is connected, via the gate pad 124, to the gate driver (not shown). The gate pad 124 includes a lower gate pad electrode 126 that extends from the gate line 102. An upper gate pad electrode 128 is connected to the lower gate pad electrode 126 that is exposed through a second contact hole 127 passing through the gate insulating film 146 and the protective film 152.

The data line 104 is connected, via the data pad 130, to a data driver (not shown). The data pad 130 includes a lower data pad electrode 132 that extends from the data line 104 along with semiconductor patterns 150 and 148 under it. An upper data pad electrode 134 is connected to the lower data pad electrode 132 that is exposed through a third contact hole 133 that passes through the protective film 152. The semiconductor patterns 150 and 148 may not be provided on the lower surface of the data line 104, and the lower data pad electrode 132 may not include the semiconductor patterns 150 and 148.

The common line 116 receives a reference voltage from a common voltage source (not shown) via the common pad 136. The common pad 136 includes a lower common pad electrode 138 that extends from the common line 116. An upper common pad electrode 140 is connected to the lower common pad electrode 138 exposed through a fourth contact hole 139 that passes through the gate insulating film 146 and the protective film 152.

The thin film transistor substrate according to the third embodiment further includes the second short preventive hole 100 formed between the horizontal portion 118B of the common electrode 118 the most adjacently provided. The first short preventive hole 200 is formed between the gate lines 102 the most adjacently provided.

The first short preventive hole 200 and the second short preventive hole 100 prevents a phenomenon in which a short is generated between the wirings in the course of processing.

FIG. 10A to FIG. 13B are section views that explain a fabricating process of a thin film transistor substrate according to the third embodiment step by step.

FIG. 10A and FIG. 10B are a plan view and a section view, respectively, that explain a first mask process in a method of fabricating the thin film transistor substrate according to the third embodiment.

A gate pattern includes the gate line 102, the gate electrode 108 and the lower gate pad electrode 126. A common pattern includes the common line 116, the common electrode 118 and the lower common pad electrode 138 that are formed on the lower substrate 145 by a first mask process.

A first conductive layer is disposed on the lower substrate 145, and a photo-resist is formed thereon by a deposition technique, for example, sputtering. The first conductive layer is formed from a metal material such as Mo, Ti, Cu, AlNd, Al, Cr and a MoW-system. The photo-resist is exposed and developed by the photolithography process using a mask, thereby providing a photo-resist pattern.

The first conductive layer is patterned by an etching process that uses the photo-resist pattern, thereby providing a gate pattern and a common pattern.

The photo-resist pattern left on the gate pattern and the common pattern are removed by a stripping process, thereby completing the gate and common pattern.

FIG. 11A and FIG. 11B are a plan view and a section view, respectively, that explain a second mask process in a method of fabricating the thin film transistor substrate according to the third embodiment.

The gate insulating film 146 is formed on the lower substrate 145 provided with the gate pattern and the common pattern, and a source/drain pattern that includes the data line 104, the source electrode 110, the drain electrode 112 and the upper data pad electrode 132 thereon. The active layer 148 overlaps along a rear surface of the source/drain pattern and a semiconductor pattern including the ohmic contact layer 150 by the second mask process. The semiconductor pattern and the source/drain pattern are defined by a single of mask process that employs a diffractive exposure mask or a half tone mask.

The gate insulating film 146, an amorphous silicon layer, an amorphous silicon layer doped with an n$^+$ or p$^+$ impurity and a source/drain metal layer are sequentially formed on the lower substrate 145 provided with the gate and common patterns. For example, the gate insulating film 146, the amorphous silicon layer, the amorphous silicon layer doped with an n$^+$ or p$^+$ impurity are formed by a PECVD, and the source/drain metal layer is formed by the sputtering. The gate insulating film 146 is formed from an inorganic insulating material such as silicon oxide (SiO$_x$) or silicon nitride (SiN$_x$), and the source/drain metal layer employs Cr, Mo, MoW, Al/Cr, Cu, Al(Nd), Al/Mo, Al(Nd)Al, Al(Nd)/Cr, Mo/Al(Nd)/Mo, Cu/Mo, Ti/Al(Nd)/Ti. After the photo-resist pattern is coated on the source/drain metal layer, the photo-resist is exposed and developed by the photolithography process using a diffractive exposure mask, thereby providing a photo-resist pattern having step coverage.

The diffractive exposure mask includes a transparent quartz substrate, a shielding layer formed from a metal layer such as a Chrome Cr thereon and a diffractive exposure slit. The shielding layer is positioned at an area in which the semiconductor pattern and the source/drain pattern are to be formed, and shields an ultraviolet ray, thereby allowing a first photo-resist pattern to be left after developing. The diffractive exposure slit is positioned at an area in which a channel of the thin film transistor is to be formed, and diffracts the ultraviolet ray, thereby allowing a second photo-resist pattern thinner than the first photo-resist pattern to be left after developing.

The source/drain metal layer is patterned by a photo-resist pattern having step coverage, thereby providing the source/drain pattern and the semiconductor pattern under it. The source electrode 110 and the drain electrode 112 of the source/drain pattern have a integrated structure.

The photo-resist pattern is ashed by an ashing process that uses an oxygen (O$_2$) plasma, so that a thickness of the first photo-resist pattern is thinned while the second photo-resist pattern is removed. The source/drain pattern is exposed with removal of the second photo-resist pattern, and the ohmic contact layer 150 under it are removed by the etching process using the first ashed photo-resist pattern, thereby separating the source electrode 110 from the drain electrode 112, and exposing the active layer 148. A channel formed from the active layer 148 is provided between the source electrode 110 and the drain electrode 112. Each side of the source/drain pattern is again etched along the ashed first photo-resist pattern, thereby providing the source/drain pattern and the semiconductor pattern with step coverage taking a stepwise shape.

The first photo-resist pattern left on the source/drain pattern is removed by the stripping process, thereby completing the semiconductor pattern and the source/drain pattern.

FIG. 12A and FIG. 12B are a plan view and a section view, respectively, that explain a third mask process in a method of fabricating the thin film transistor substrate according to the present embodiment.

The first to fourth contact hole 113, 127, 133 and 139, and the protective film 152 that have a first hole 200' (a first short preventive hole on the condition that a lower substrate is not exposed) and a second hole (a second short preventive hole on the condition that a lower substrate is not exposed) formed on the gate insulating film 146 provided with the semiconductor pattern and the source/drain pattern by the third mask process.

The protective film 152 is formed on the gate insulating film 146 that is provided with the semiconductor pattern and the source/drain pattern by a technique such as the PECVD, the spin coating and the spinless coating. The protective film 152 is made from an inorganic insulating material identical to the gate insulating film 146, or an organic insulating material. The protective film 152 and the gate insulating film 146 is patterned on the protective film 152 by the photolithography process and the etching process using the third mask, thereby providing the first to fourth contact hole 113, 127, 133 and 139, and the first and second short preventive hole 200 and 100. Each first and third contact hole 113 and 133 pass through the protective film 152 to expose the drain electrode 112 and the lower data pad electrode 132, respectively. Each second and fourth contact hole 127 and 138 pass through the protective film 152 and the gate insulating film 146 to expose the lower gate pad electrode 126 and the lower common pad electrode 138, respectively. Each first and second short preventive hole on the condition that the lower substrate is not exposed, that is, the first hole 200' and the second hole 100' pass through the protective film 152 and the gate insulating film 146 to expose the lower substrate 145.

In the first mask process, if the horizontal portion 118B of the common electrode 118 and the gate line 102 space are provided in such a manner to adjoin with each other, and the gate line 102 and the gate line 102 space are provided in such a manner to adjoin with each other are not properly patterned but shorted, then each first and second hole 200' and 100' pass through the protective film 152 and the gate insulating film 146 to expose the gate metal layer.

FIG. 13A and FIG. 13B are a plan view and a section view, respectively, that explain a fourth mask process in a method of fabricating the thin film transistor substrate according to the embodiment.

A transparent conductive pattern includes the pixel electrode 118, the upper gate pad electrode 128, the upper data pad electrode 134 and the upper common pad electrode 140 is formed on the protective film 152. The first and second short preventive hole 200 and 100 are formed by the fourth mask process.

The transparent conductive layer is provided on the protective film 152 by a deposition technique such as sputtering. The transparent conductive layer is formed from ITO, TO, IZO. The transparent conductive layer is patterned by the photolithography process and the etching process using the fourth mask, thereby providing the transparent conductive pattern including the pixel electrode 118, the upper gate pad electrode 128, the upper data pad electrode 134 and the upper common pad electrode 140. Each pixel electrode 118, upper gate pad electrode 128, upper data pad electrode 134 and upper common pad electrode 140 is connected to the drain electrode 112, the lower gate pad electrode 126, the lower data pad electrode 132 and the lower common pad electrode 138 exposed through each first to fourth contact hole 113, 127, 133 and 139, respectively. For example, each pixel electrode 118, upper gate pad electrode 128, upper data pad electrode 134 and upper common pad electrode 140 contact with a surface of the drain electrode 112, the lower gate pad electrode 126, the lower data pad electrode 132 and the lower common pad electrode 138, respectively.

Referring to FIG. 15A and FIG. 15B, a gate metal layer between the shorted wirings exposed through the shorted first and second hole 200' and 100', that is, the first and second short preventive hole on the condition that the lower substrate is not exposed, identical to FIG. 14A and FIG. 15B is simultaneously etched along with the transparent conductive layer in the course of etching the transparent conductive layer of the fourth mask process. The first short preventive hole 200 and the second short preventive hole 100 are completed between the short wirings by the etching process, and a space between the short wirings is electrically interrupted by the first short preventive hole 200 and the second short preventive hole 100.

The space between the short wirings is electrically interrupted by the first short preventive hole 200 and the second short preventive hole 100, so that it becomes possible to improve a manufacturing productivity of a liquid crystal display device without an extra short inspection.

In a liquid crystal display device of a horizontal electric field type and a fabricating method thereof, it becomes possible to increase a capacitance of a storage capacitor by a first and second storage capacitor provided in parallel at one pixel area.

It also becomes possible to reduce an area that is formed from an opaque metal at the pixel area because a bifarious second storage capacitor is provided in such a manner to share one common line between gate lines formed in such a manner to have a symmetry with having a bifarious unit pixel area therebetween. It also becomes possible to improve an aperture ratio of the liquid crystal display device, if an area of a common line formed from the opaque metal at the pixel area is decreased, then an area that transmits is increased.

The space between the short wirings is electrically interrupted by the first short preventive hole and the second short preventive hole, an thus it becomes possible to improve a manufacturing productivity of a liquid crystal display device without an extra short inspection.

It should be understood to the ordinary skilled person in the art that the invention is not limited to the embodiments, but rather that various changes or modifications thereof are possible without departing from the spirit of the embodiments. Accordingly, the scope of the invention shall be determined only by the appended claims and their equivalents.

What is claimed is:

1. A liquid crystal display device of horizontal electric field type, comprises:
   a plurality of gate lines;
   a plurality of data lines;
   a first short preventive hole is only arranged between a (n−1)th gate line and a (n)th gate line of the plurality of gate lines, and
   wherein two pixels are arranged between the (n)th gate line and a (n+1)th gate line of the plurality of gate lines,
   wherein each of the two pixels is connected a first storage capacitor and a second storage capacitor,
   wherein the first storage capacitor is provided at an overlapping area between a common electrode and a pixel electrode, and
   wherein the second storage capacitor is provided at an overlapping area between a common line and the pixel electrode.

2. The liquid crystal display device as claimed in claim 1;
   wherein the plurality of gate lines are provided on a lower substrate;
   wherein the data lines cross the gate lines to define a pixel area; and
   wherein the data lines and gate lines are insulated from each other.

3. The liquid crystal display device as claimed in claim 2, wherein the (n−1)th gate line and the (n)th gate line are symmetrical to each other with respect to the first short preventive hole.

4. The liquid crystal display device of horizontal electric field applying type as claimed in claim 2, wherein the (n)th gate line and the (n+1)th gate line are symmetrical to each other with respect to the two pixels.

5. The liquid crystal display device as claimed in claim 2, wherein the two pixels includes a first pixel and a second pixel, and
   wherein the first and second pixel shares the common line.

6. The liquid crystal display device as claimed in claim 2, further comprising:
   a second short preventive hole that is provided between the two pixels and the gate line.

7. The liquid crystal display device as claimed in claim 2, wherein the (n)th gate line is formed in such a manner to adjoin with the (n−1)th gate line.

8. A method of fabricating a liquid crystal display device, comprising the acts of:
   forming a gate pattern that includes a (n−1)th, a (n)th and a (n+1)th gate line on a lower substrate;
   forming a gate insulating film that covers the gate pattern;
   forming a semiconductor pattern on the gate insulating film, and a source/drain pattern that overlaps on the semiconductor pattern;
   forming a protective film that covers the source/drain pattern; and
   forming a first short preventive hole between the (n)th gate line and the (n−1)th gate line,
   simultaneously forming a pixel electrode between the (n)th gate line and the (n+1)th gate line, and a second short preventive hole between the (n)th gate line and the (n+1)th gate line when the first short preventive hole is formed.

9. The method as claimed in claim 8, wherein the act of forming the first short preventive hole includes:
   forming a contact hole that exposes the drain electrode, and a first hole that passes through the gate insulating film and the protective film between the (n−1)th gate line and the (n)th gate line; and
   forming pixel electrodes that are connected to the drain electrode via the contact hole between the (n)th gate line and the (n−1)th gate line, and a first short preventive hole to expose the lower substrate positioned at a lower portion of the first hole.

10. The method as claimed in claim 8 wherein the act of forming the first short preventive hole includes:
   forming a contact hole that exposes the drain electrode, and a first hole that passes through the gate insulating film and the protective film between the (n−1)th gate line and the (n)th gate line; and
   forming pixel electrodes that are connected to the drain electrode via the contact hole between the (n)th gate line and the (n−1)th gate line, and a first short preventive hole that exposes the lower substrate positioned at a lower portion of the first hole.

11. The method as claimed in claim 10, wherein the act of forming the second short preventive hole includes:
   simultaneously forming a second hole that passes through the gate insulating film and the protective film between the pixel electrode and the gate lines adjacent to the pixel electrode when the contact hole and the first hole are formed; and
   simultaneously forming a second short preventive hole to expose the lower substrate positioned at a lower portion of the second hole when the pixel electrodes and the first short preventive hole are formed.

* * * * *

UNITED STATES PATENT AND TRADEMARK OFFICE
CERTIFICATE OF CORRECTION

PATENT NO. : 7,663,710 B2 Page 1 of 1
APPLICATION NO. : 11/479427
DATED : February 16, 2010
INVENTOR(S) : Park et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 363 days.

Signed and Sealed this

Thirtieth Day of November, 2010

David J. Kappos
*Director of the United States Patent and Trademark Office*